(12) United States Patent
Choi et al.

(10) Patent No.: US 11,378,814 B2
(45) Date of Patent: Jul. 5, 2022

(54) CAMERA MODULE WITH CONTROLLER TO MOVE IMAGE SENSOR OR LENS ASSEMBLY

(71) Applicants: LG INNOTEK CO., LTD., Seoul (KR); CORNING INCORPORATED, Corning, NY (US)

(72) Inventors: Yong Bok Choi, Seoul (KR); Eun Sung Seo, Seoul (KR)

(73) Assignees: LG INNOTEK CO., LTD., Seoul (KR); CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/056,337

(22) PCT Filed: May 17, 2019

(86) PCT No.: PCT/KR2019/005908
§ 371 (c)(1),
(2) Date: Nov. 17, 2020

(87) PCT Pub. No.: WO2019/221541
PCT Pub. Date: Nov. 21, 2019

(65) Prior Publication Data
US 2021/0208417 A1 Jul. 8, 2021

(30) Foreign Application Priority Data
May 18, 2018 (KR) .................. 10-2018-0057410

(51) Int. Cl.
*H04N 5/228* (2006.01)
*G02B 27/64* (2006.01)
(Continued)

(52) U.S. Cl.
CPC ............ *G02B 27/646* (2013.01); *G02B 3/14* (2013.01); *G03B 5/00* (2013.01); *H04N 5/2253* (2013.01);
(Continued)

(58) Field of Classification Search
CPC ...... G02B 27/646; G02B 3/14; H04N 5/2253; H04N 5/2254; H04N 5/23287; G03B 2205/0015
(Continued)

(56) References Cited

U.S. PATENT DOCUMENTS 8,922,636 B1* 12/2014 Belden .................. G01P 5/001
348/77
2005/0254137 A1* 11/2005 Yamada ......... G02B 15/144113
359/680

(Continued)

FOREIGN PATENT DOCUMENTS

EP 2778734 A1 9/2014
EP 3508911 A1 7/2019
(Continued)

*Primary Examiner* — Usman A Khan
(74) *Attorney, Agent, or Firm* — Birch, Stewart, Kolasch & Birch, LLP

(57) ABSTRACT

A camera module includes a lens assembly comprising a plurality of solid lenses, an image sensor disposed on an optical axis of the plurality of solid lenses, a liquid lens disposed on the optical axis, the liquid lens being disposed on the image sensor, and a controller configured to move the image sensor in a direction perpendicular to the optical axis.

19 Claims, 26 Drawing Sheets

(51) Int. Cl.
   *G02B 3/14*     (2006.01)
   *G03B 5/00*     (2021.01)
   *H04N 5/225*    (2006.01)
   *H04N 5/232*    (2006.01)

(52) U.S. Cl.
   CPC ....... *H04N 5/2254* (2013.01); *H04N 5/23287* (2013.01); *G03B 2205/0015* (2013.01)

(58) Field of Classification Search
   USPC .................................................. 348/208.11
   See application file for complete search history.

(56) References Cited

U.S. PATENT DOCUMENTS

| | | | |
|---|---|---|---|
| 2005/0264656 A1* | 12/2005 | Seo ..................... | H04N 5/2253 348/219.1 |
| 2006/0028734 A1* | 2/2006 | Kuiper .................... | G02B 3/14 359/676 |
| 2008/0048652 A1* | 2/2008 | Murakita ............... | G01R 33/07 324/207.11 |
| 2008/0198249 A1 | 8/2008 | Tanimura et al. | |
| 2009/0231537 A1 | 9/2009 | Yamamiya | |
| 2010/0123007 A1* | 5/2010 | Wittenberg ........ | G06K 7/10722 235/454 |
| 2011/0118610 A1 | 5/2011 | Kuiper et al. | |
| 2018/0039156 A1 | 2/2018 | Moon et al. | |

FOREIGN PATENT DOCUMENTS

| | | |
|---|---|---|
| WO | WO 2016/137273 A1 | 9/2016 |
| WO | WO 2017/149092 A2 | 9/2017 |
| WO | WO 2018/044131 A1 | 3/2018 |

\* cited by examiner

[FIG. 1]
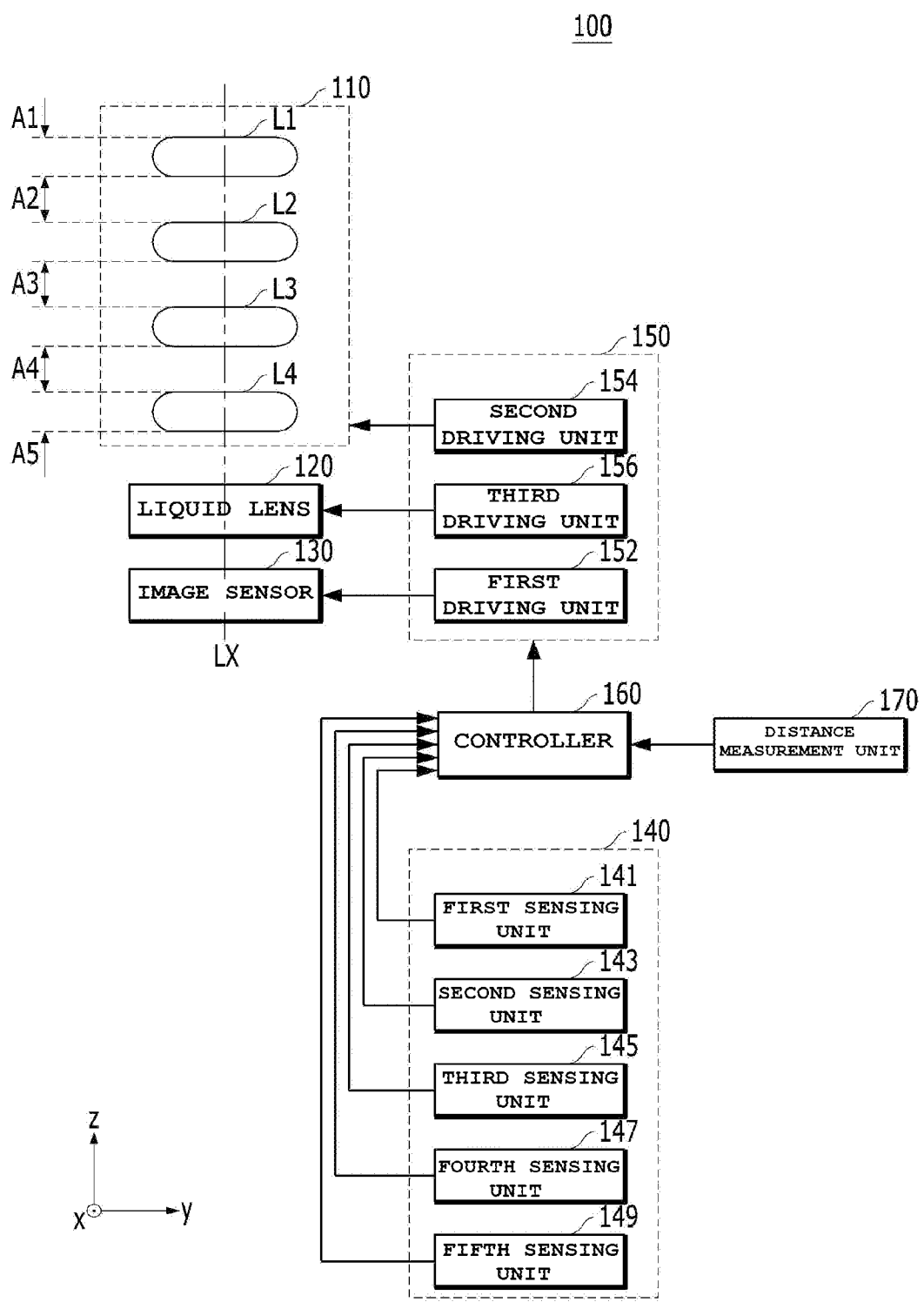

[FIG. 2]
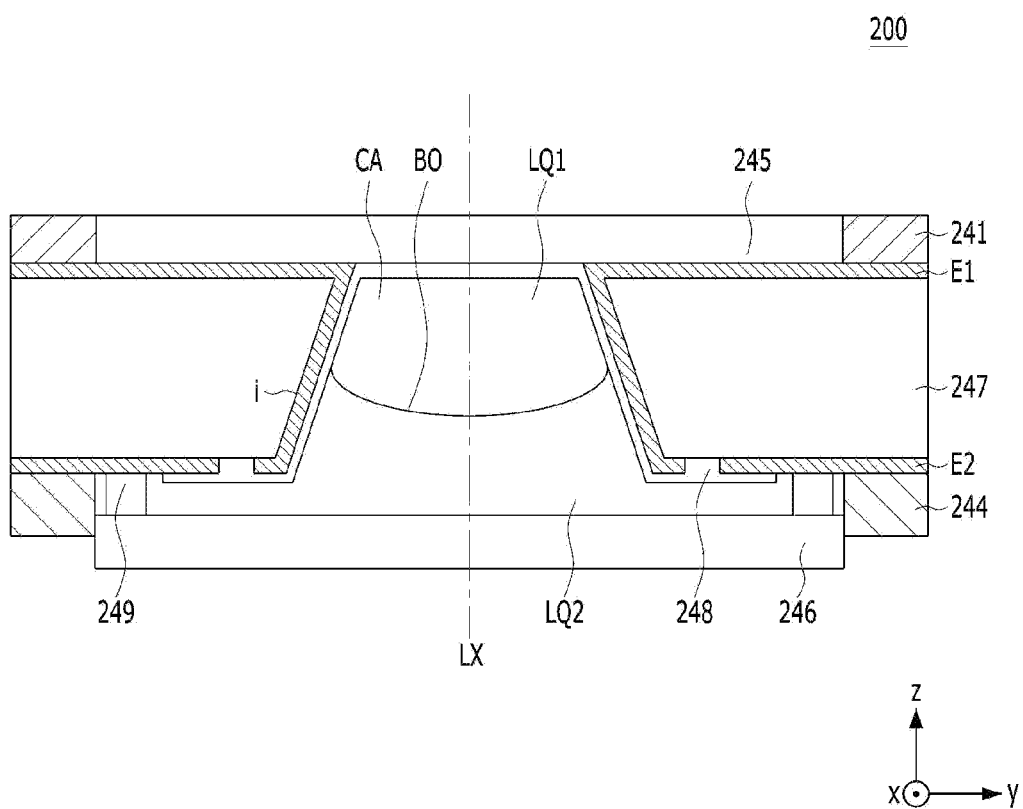

[FIG. 3A]
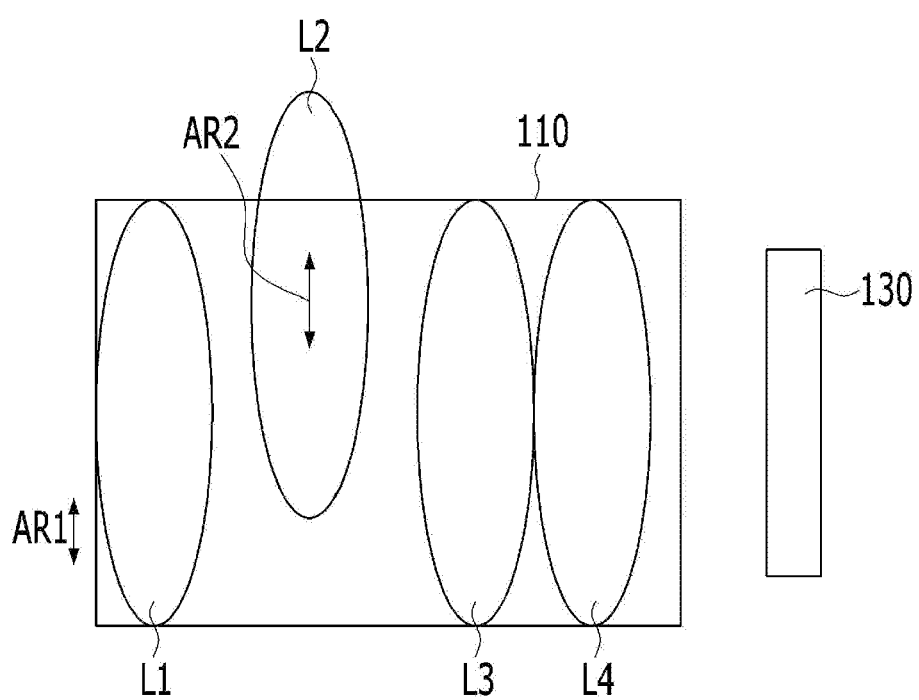

【FIG. 3B】
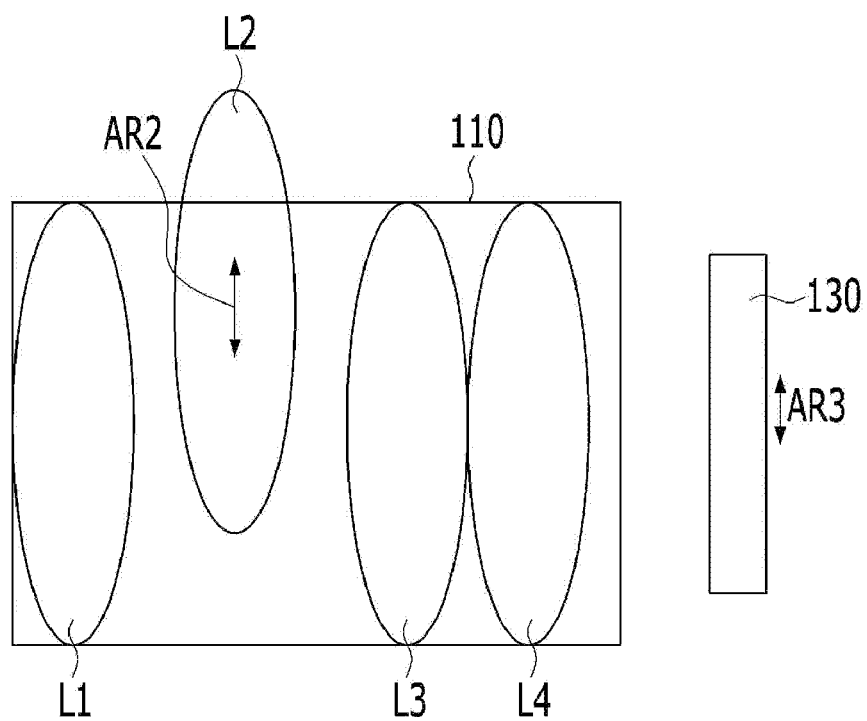
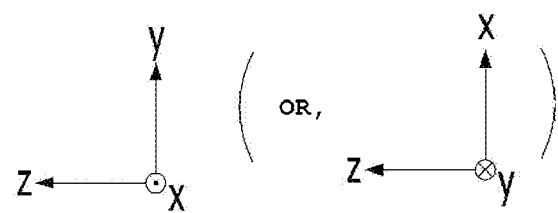

[FIG. 3C]
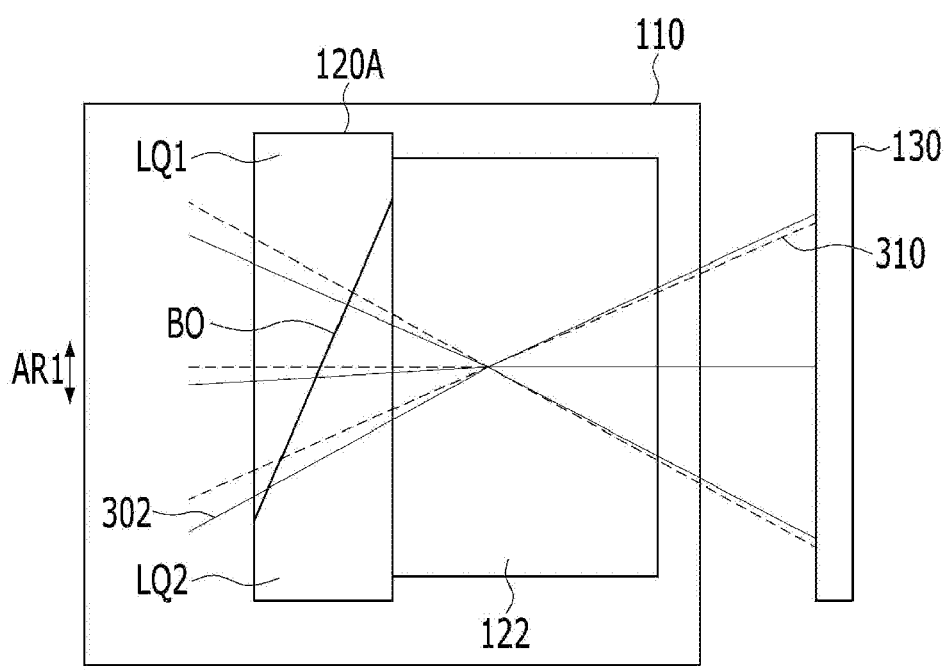
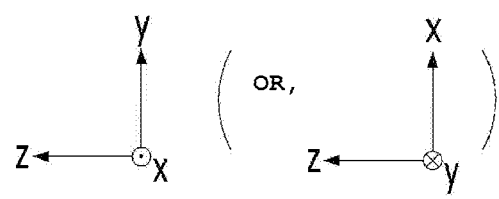

[FIG. 3D]
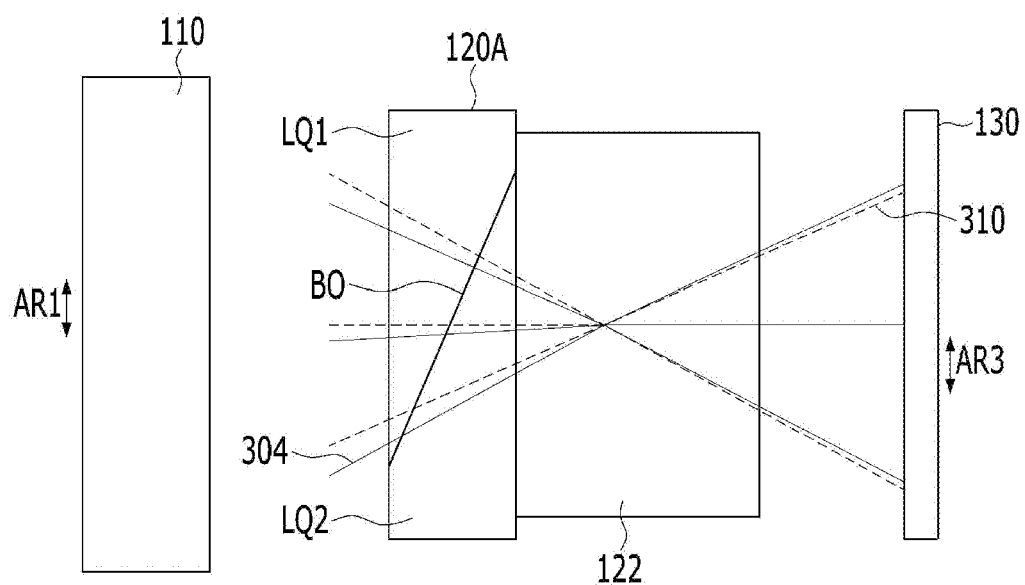

【FIG. 3E】
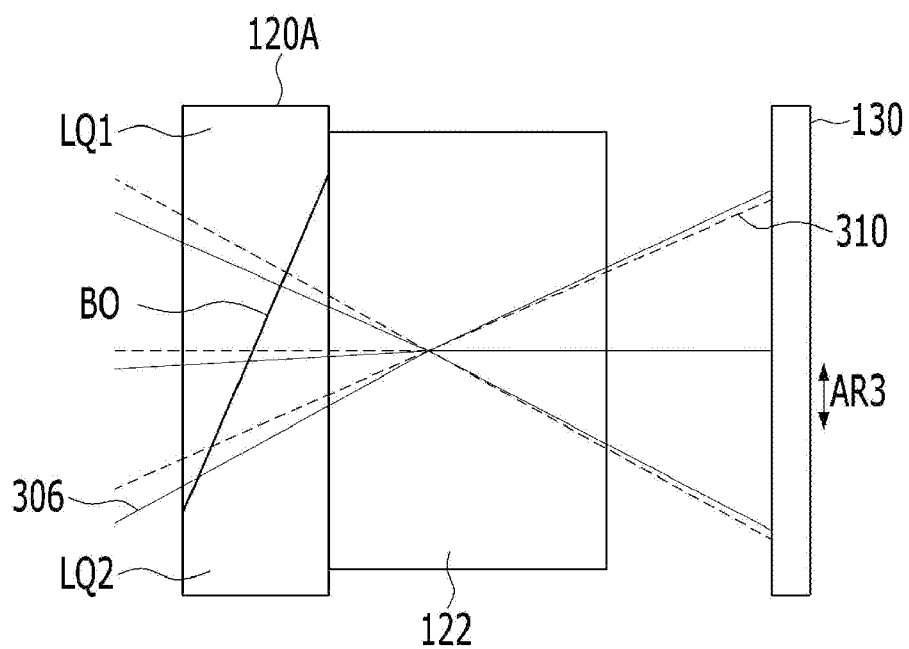
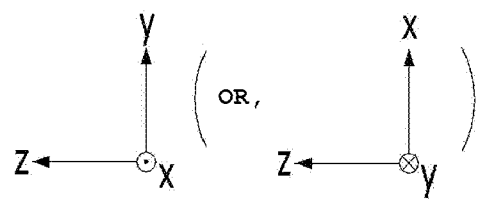

[FIG. 4A]
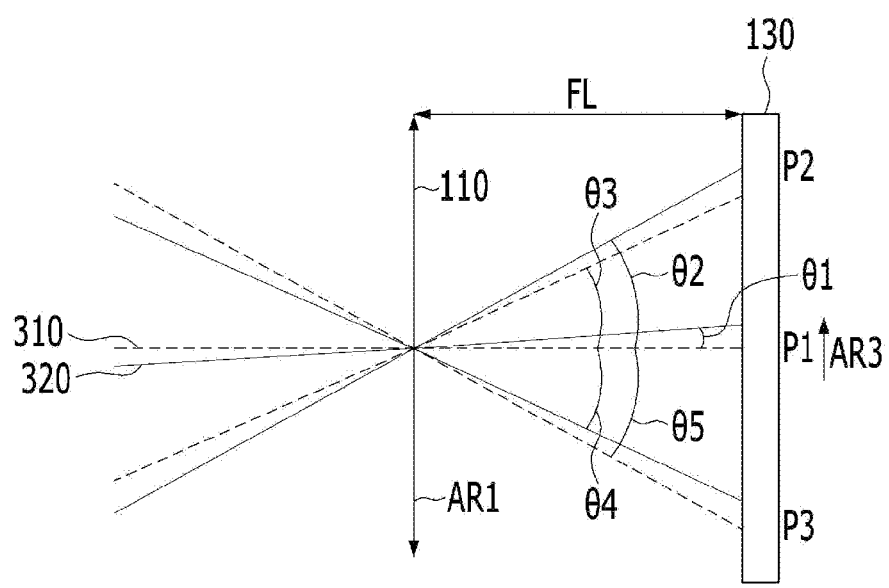
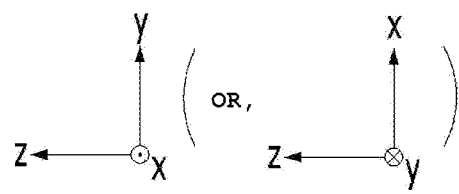

【FIG. 4B】
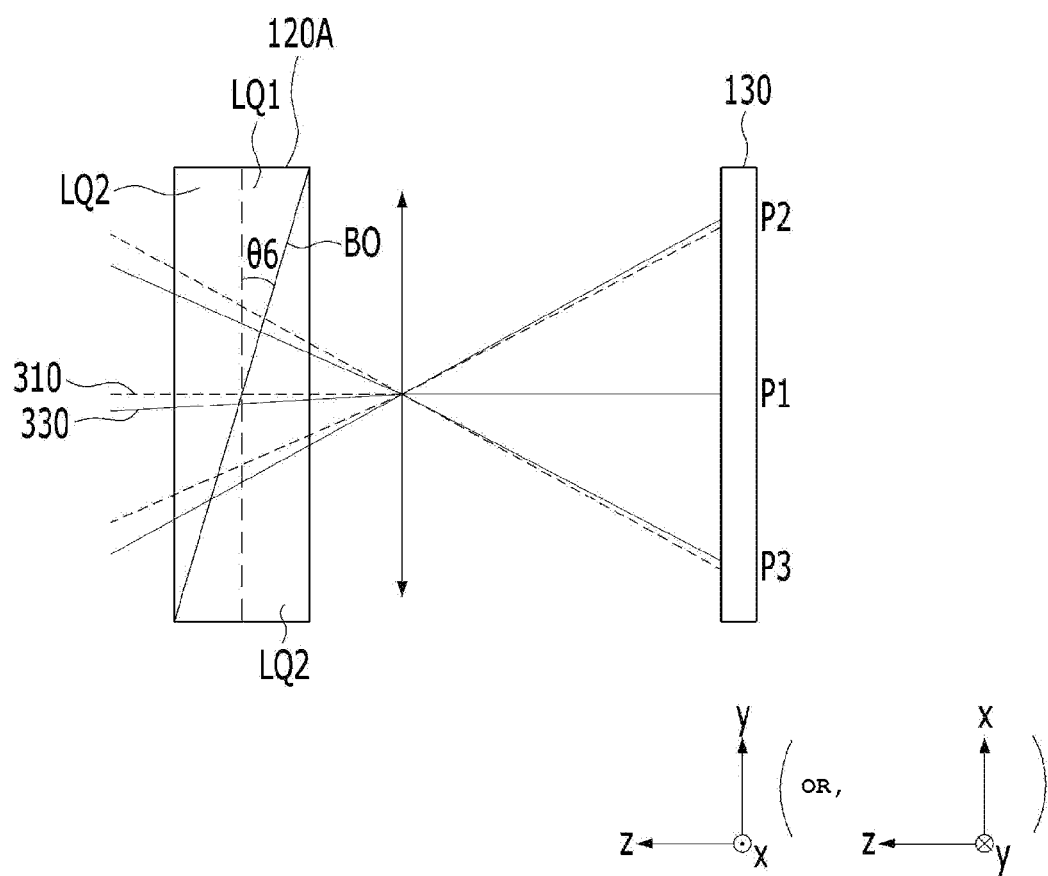

[FIG. 4C]
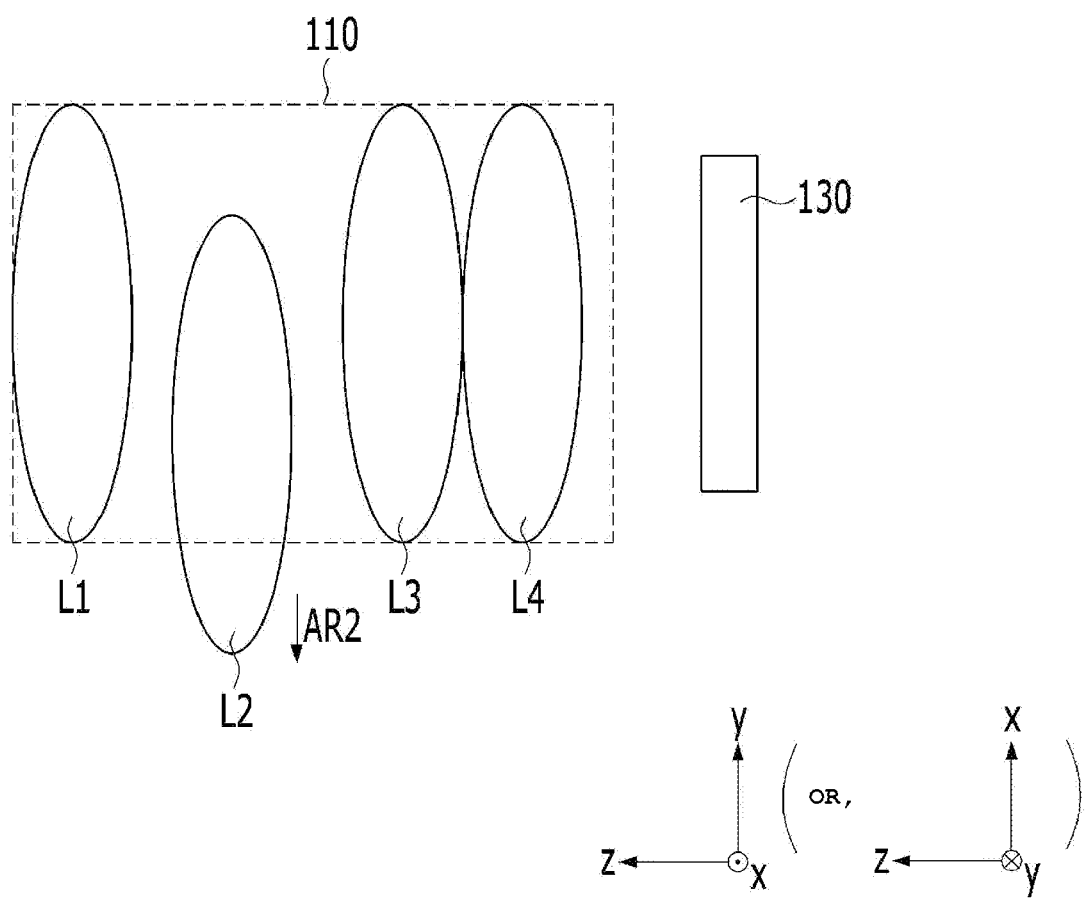

[FIG. 5]
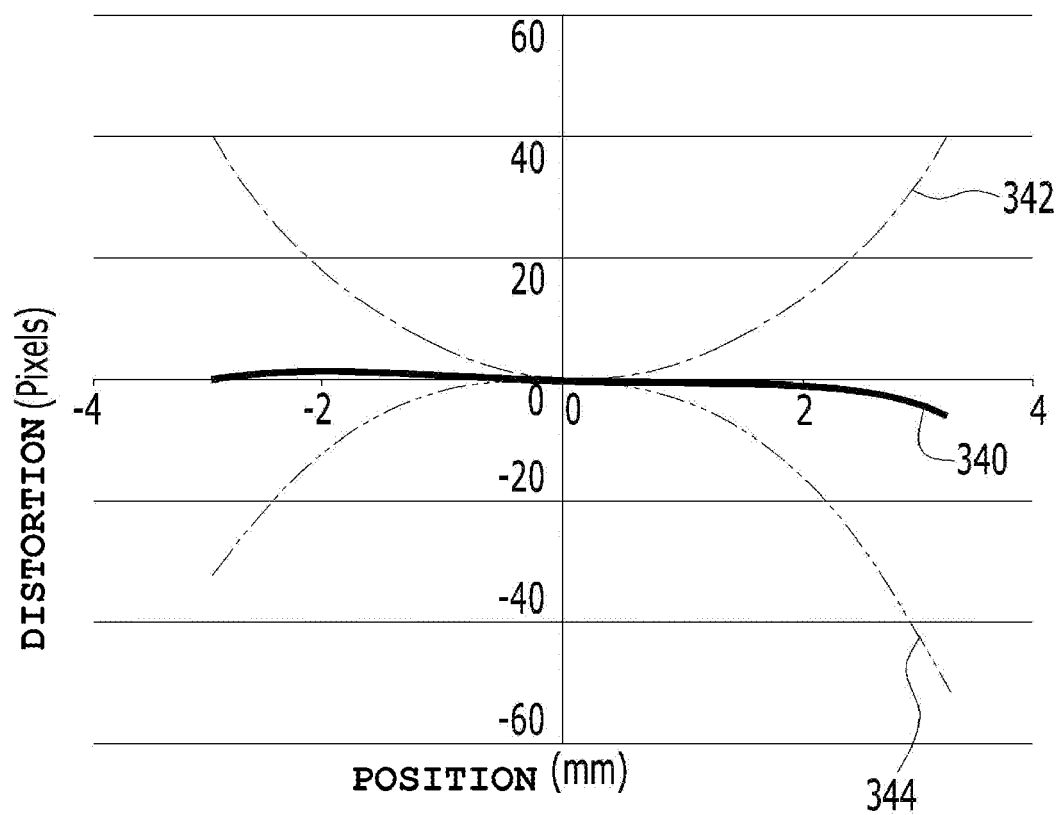

【FIG. 6A】
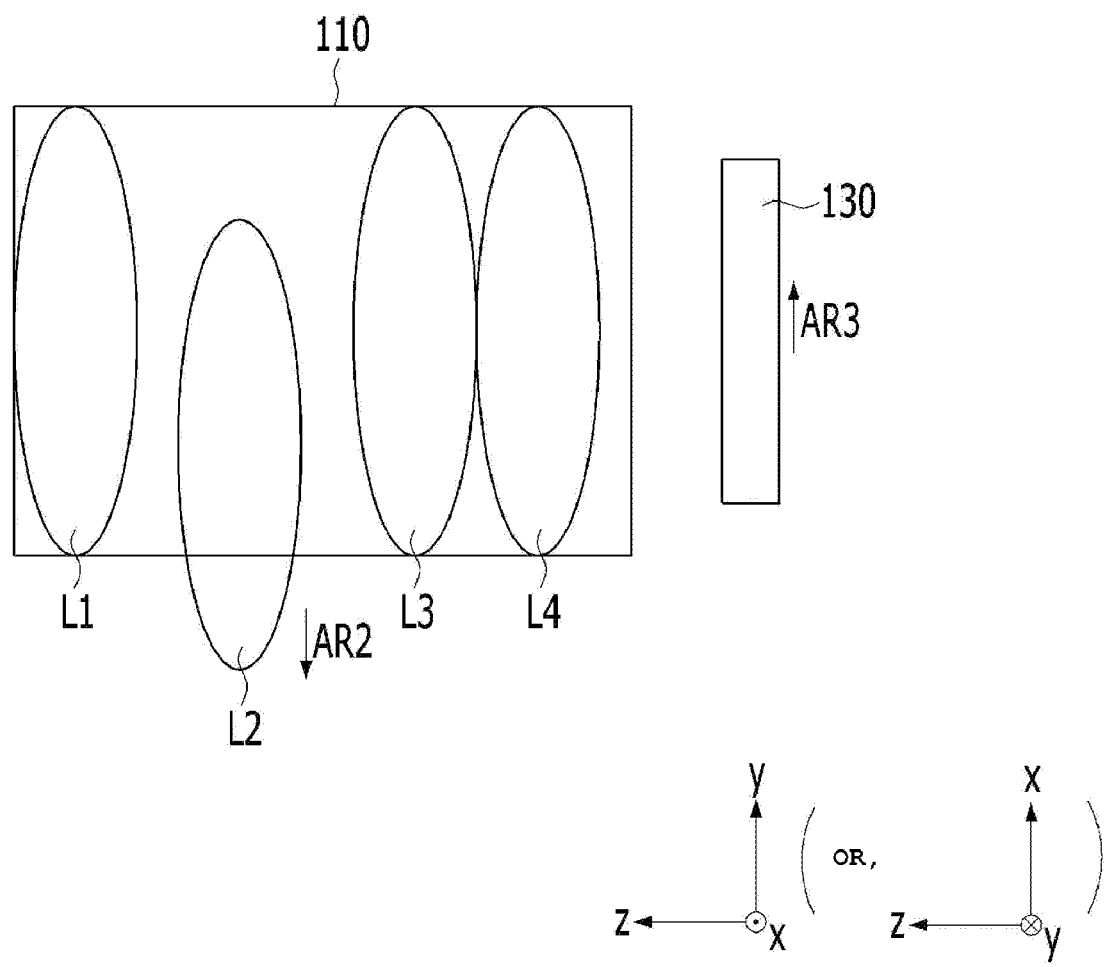

[FIG. 6B]
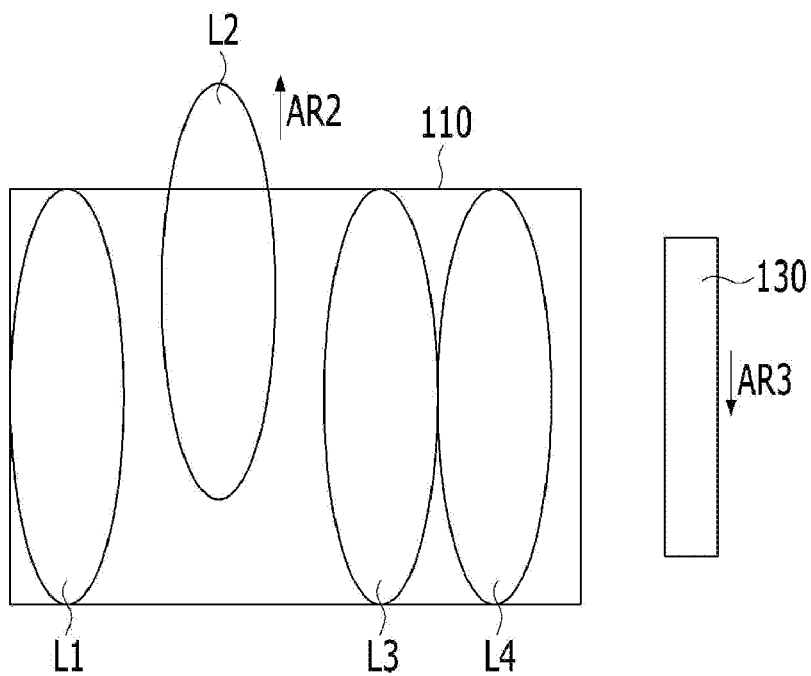
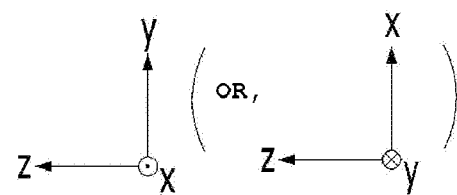

[FIG. 7A]
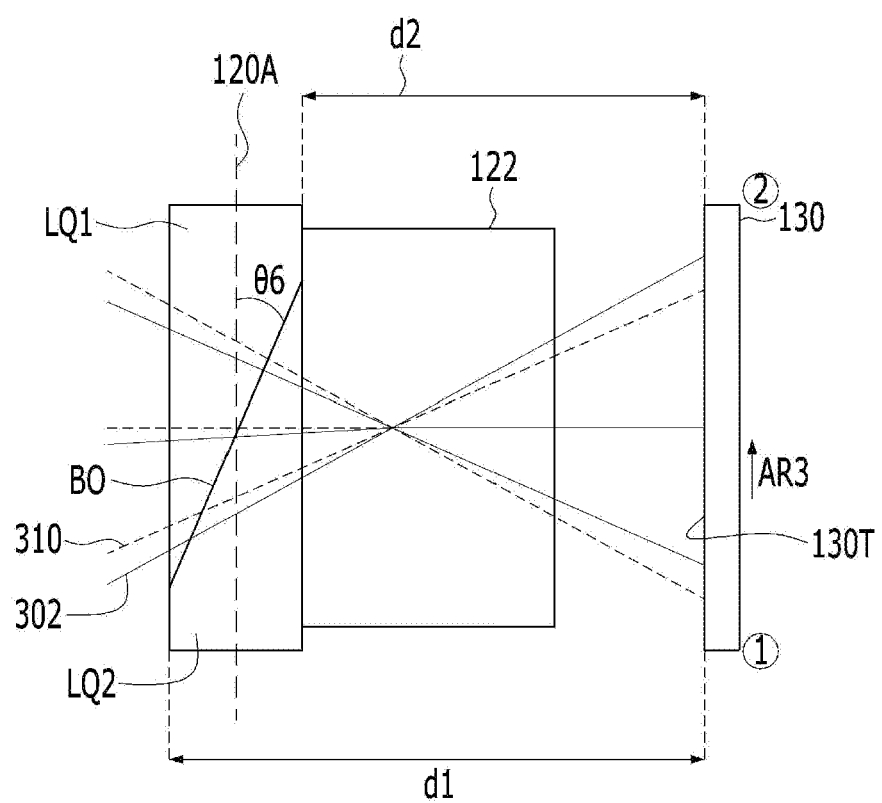
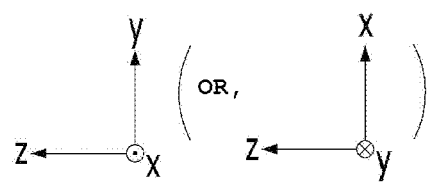

【FIG. 7B】
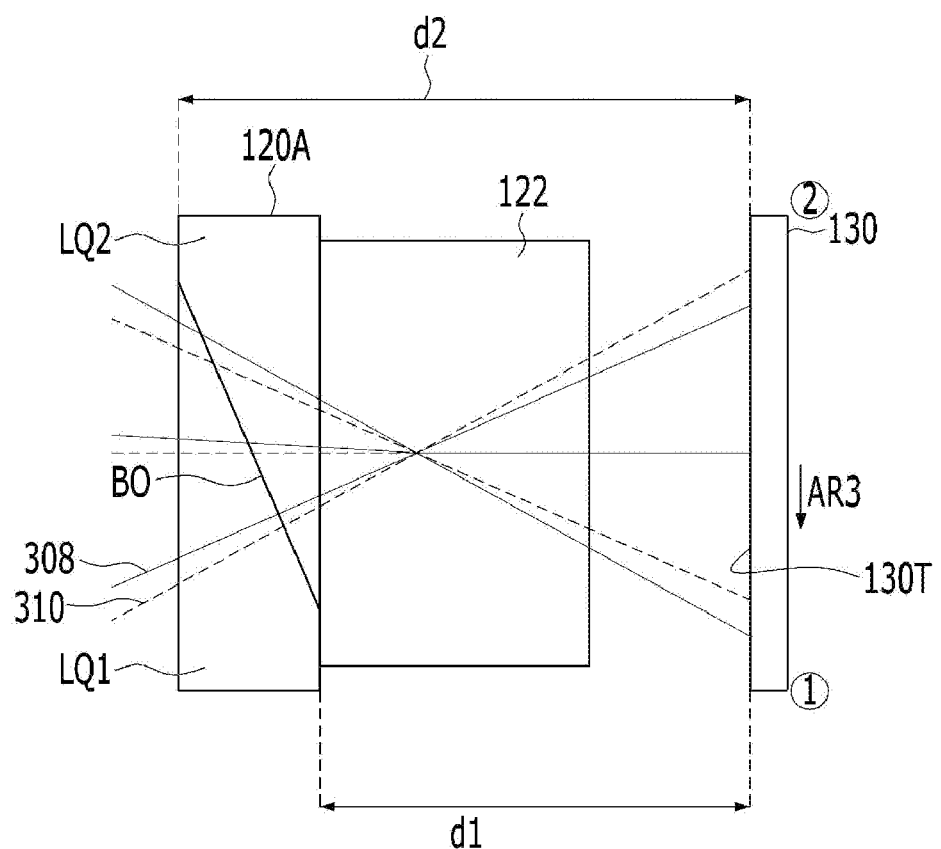
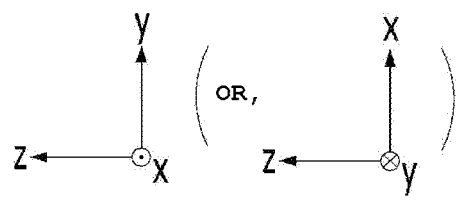

[FIG. 8]
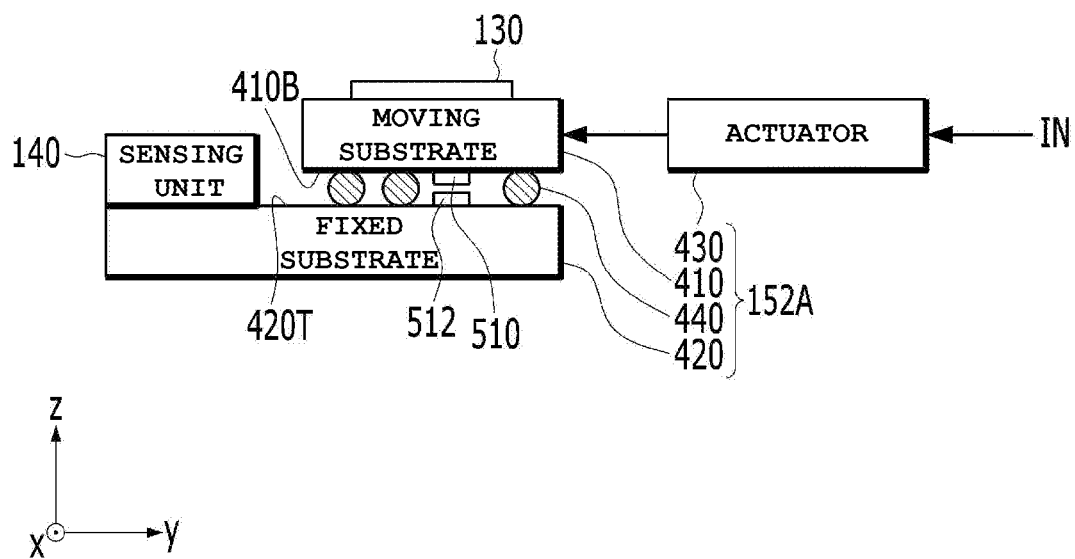
[FIG. 9]
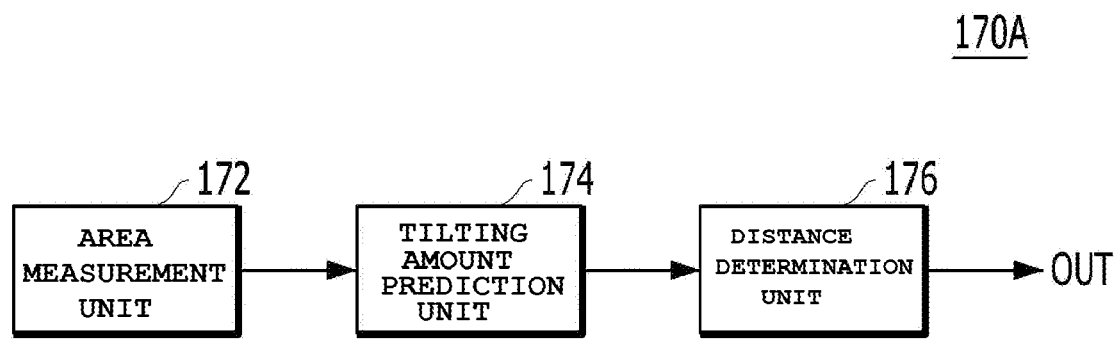

[FIG. 10]
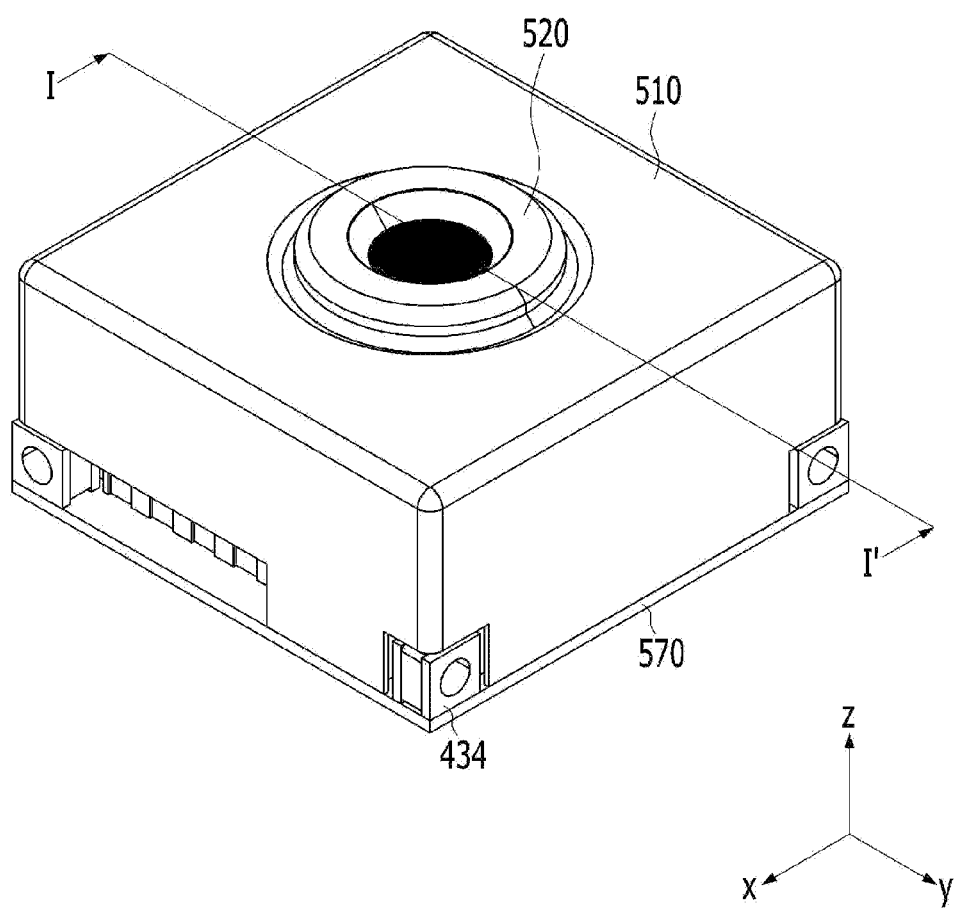

【FIG. 11】
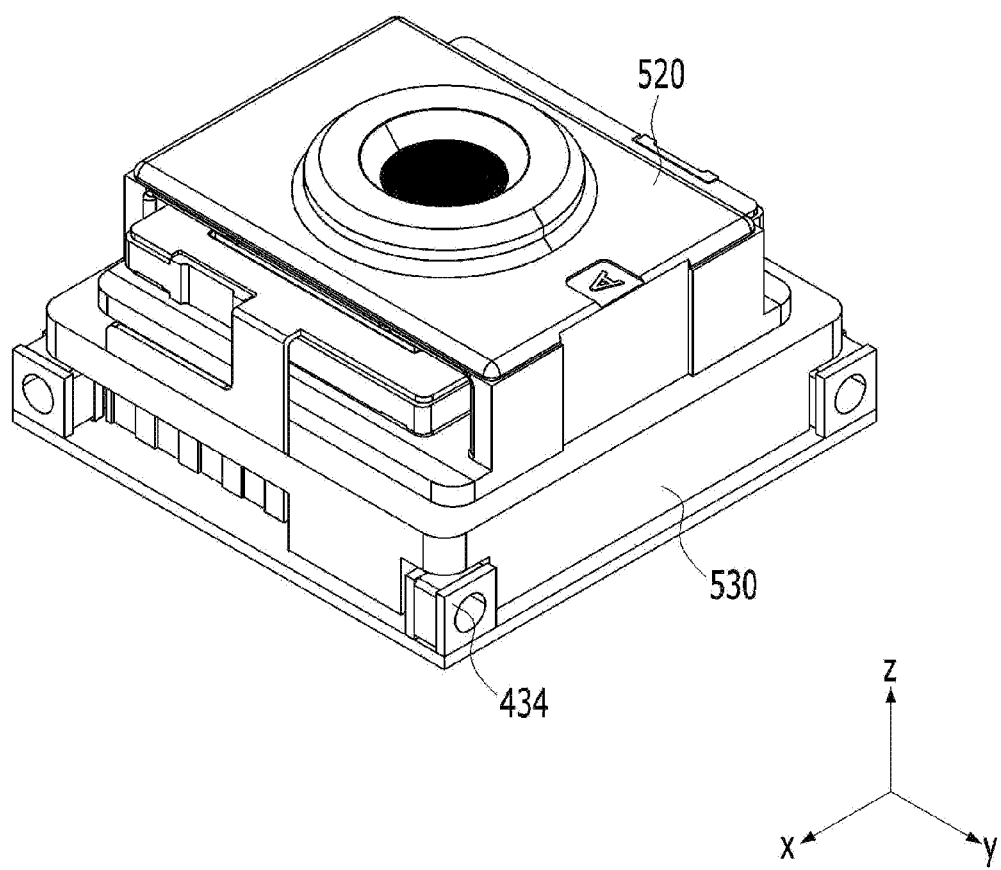

[FIG. 12]
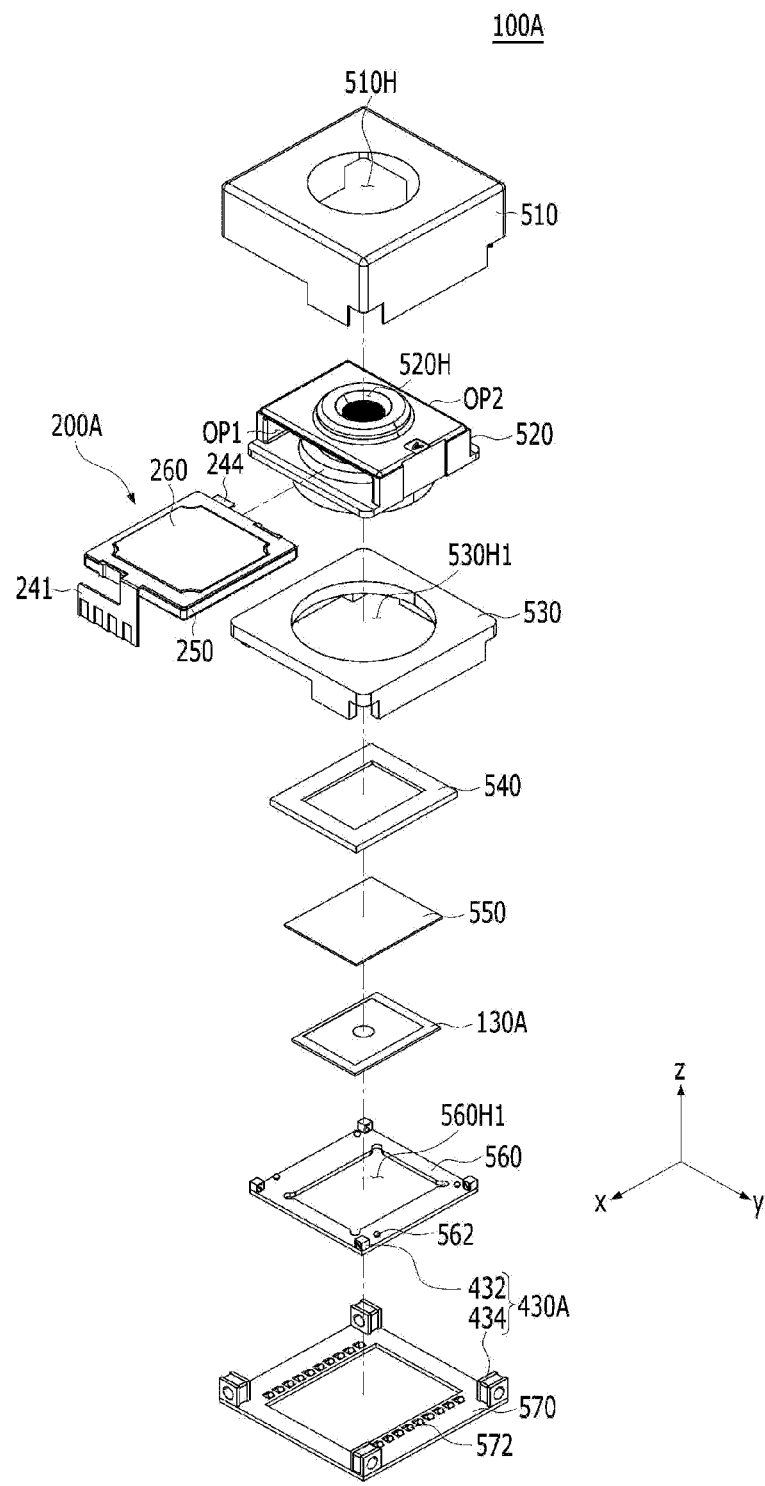

[FIG. 13]
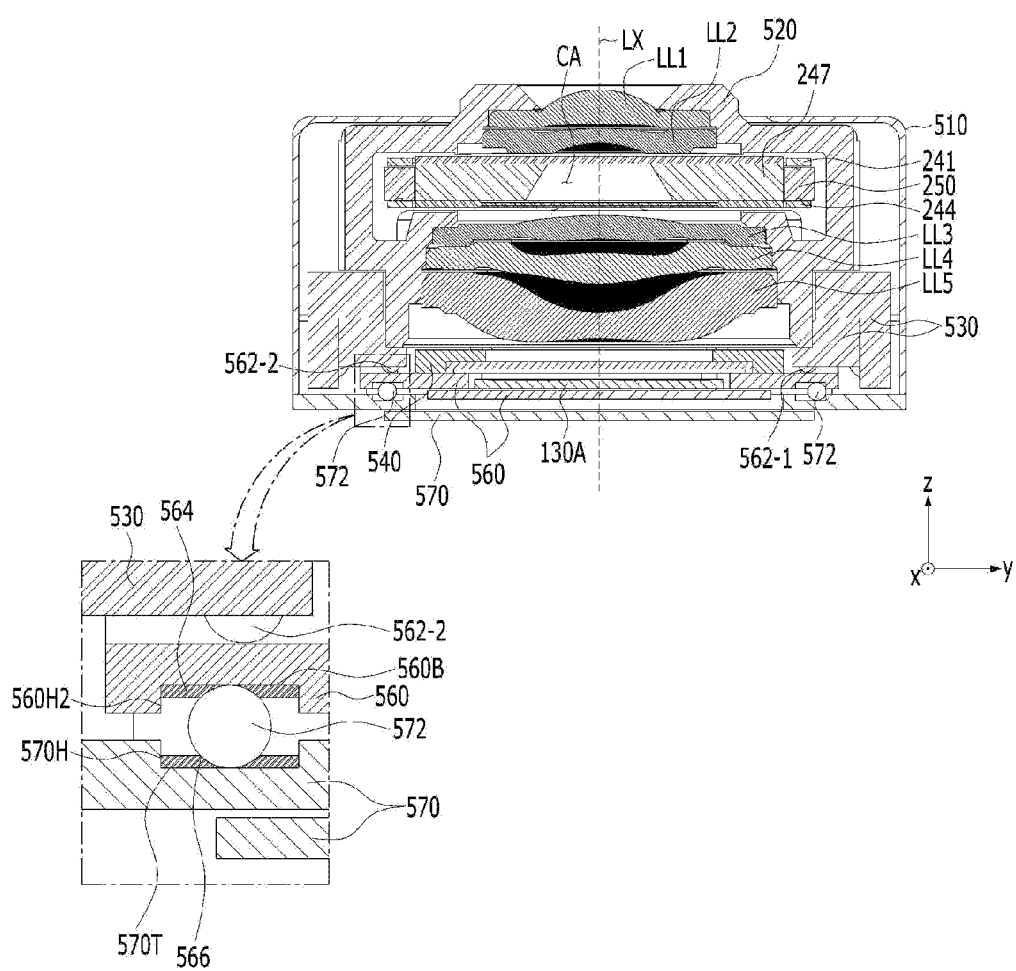

[FIG. 14]
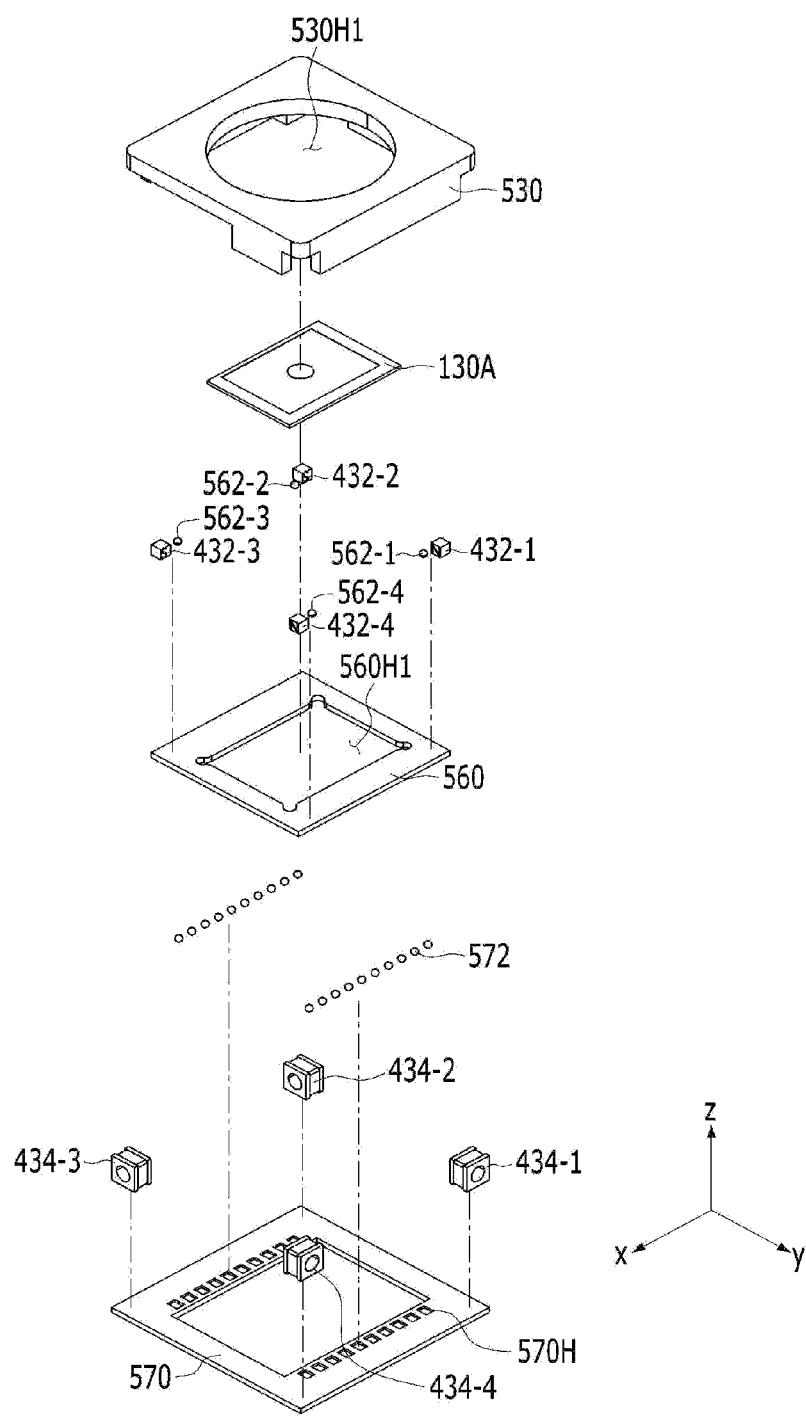

[FIG. 15]
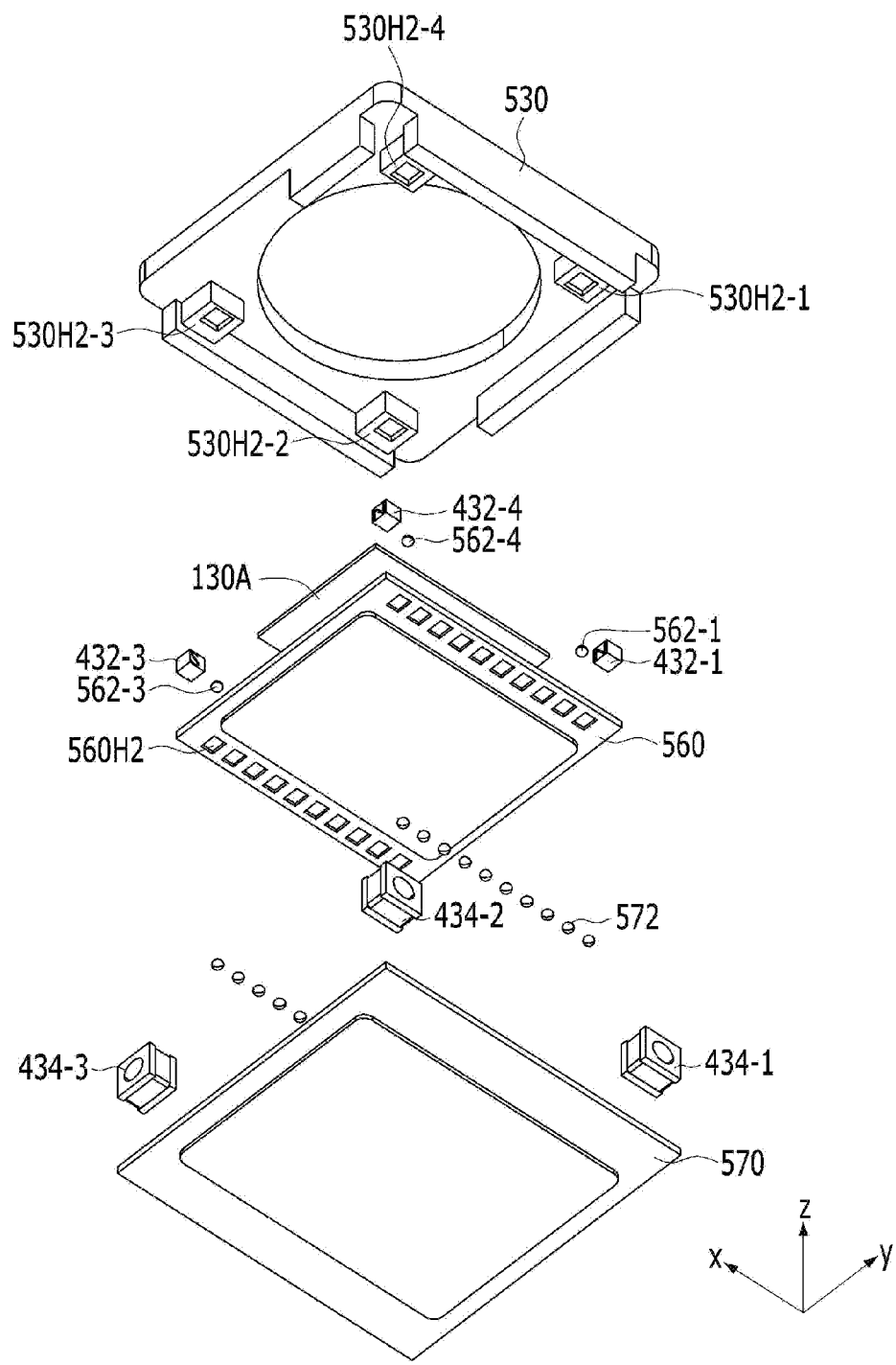

[FIG. 16]
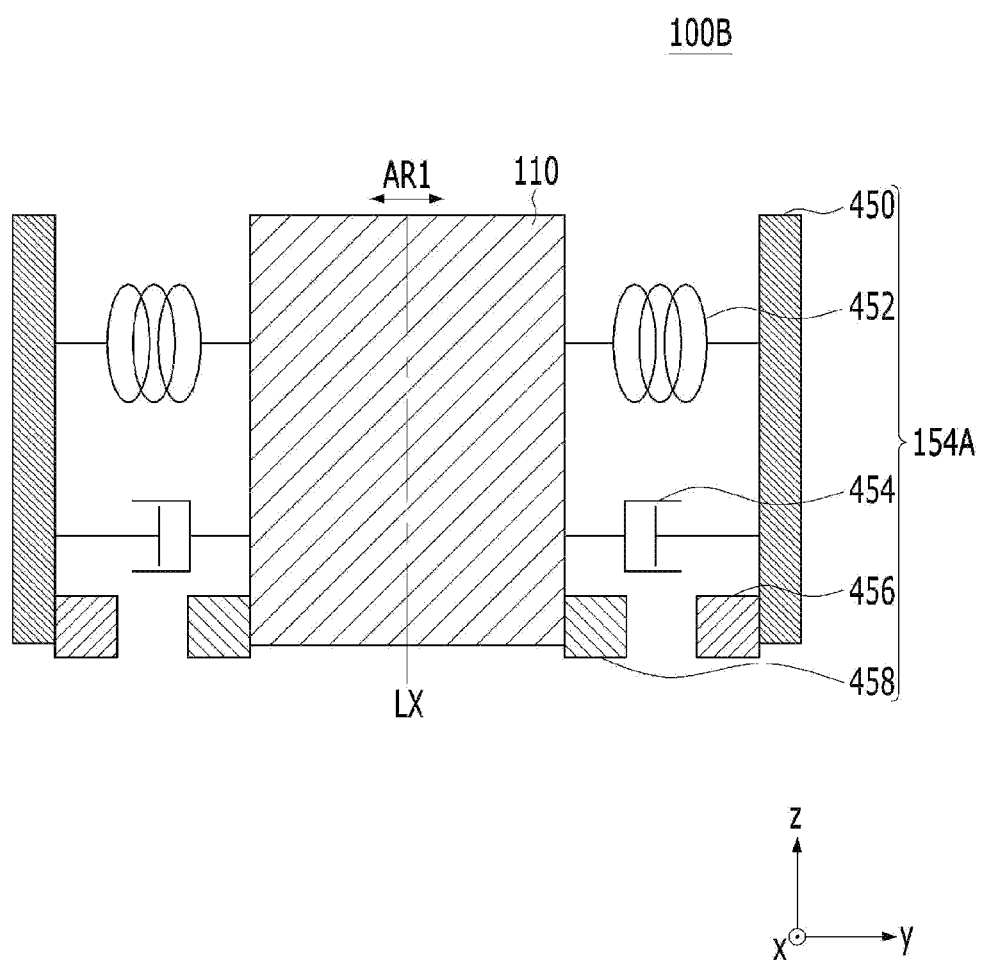

[FIG. 17]
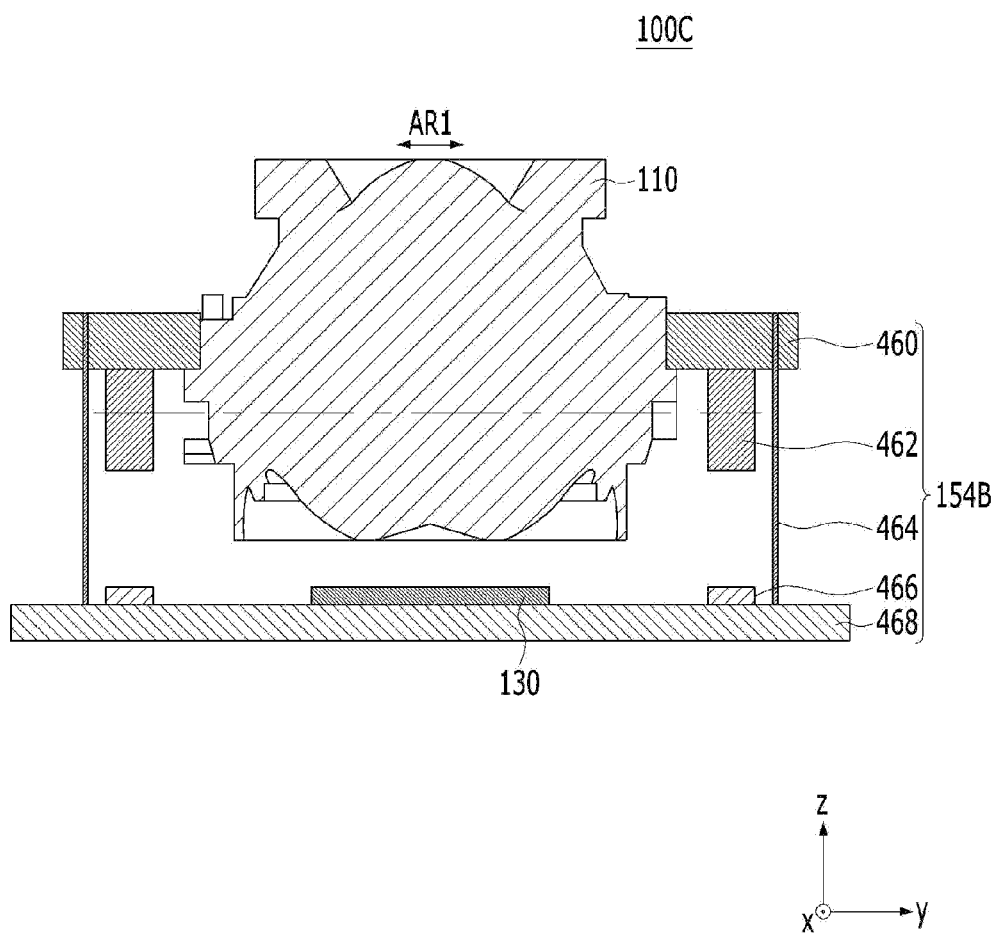

[FIG. 18]
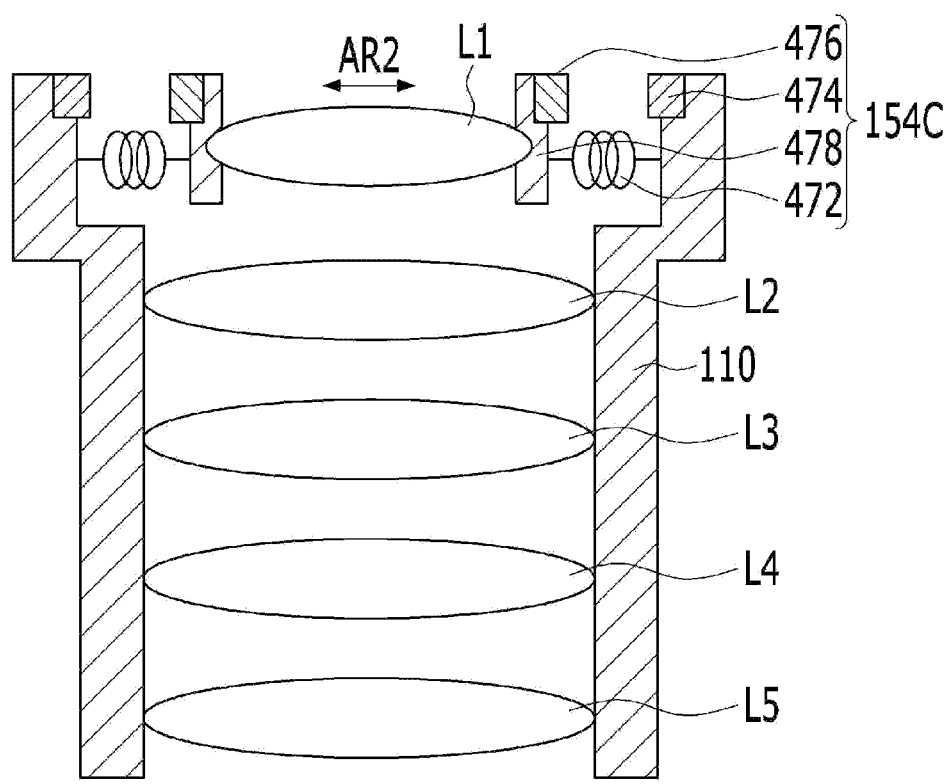

[FIG. 19]
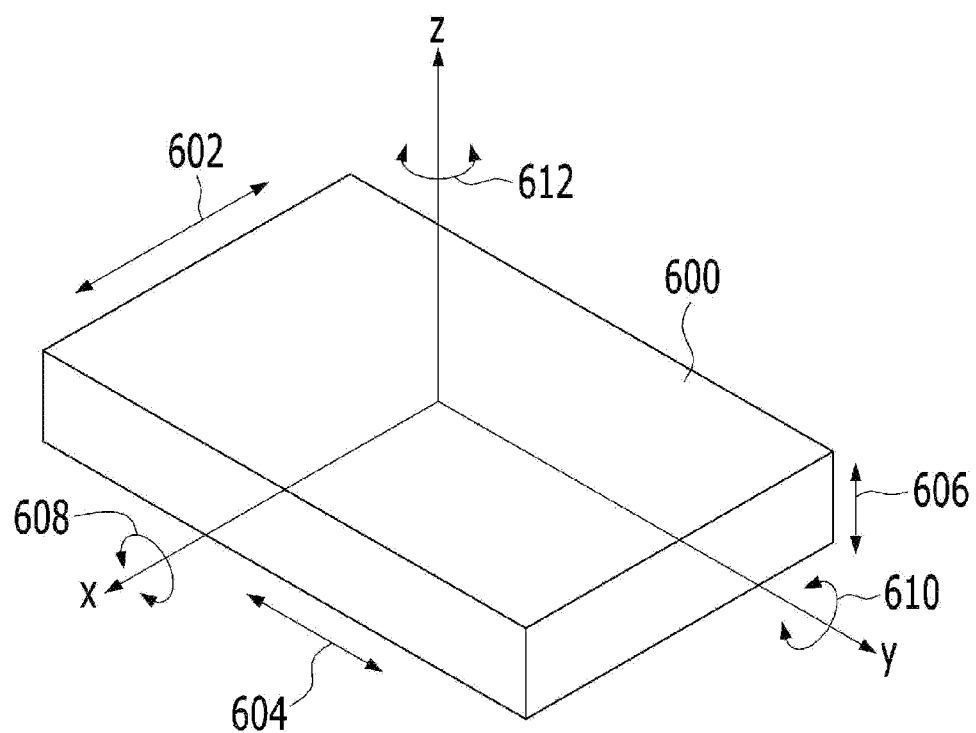

CAMERA MODULE WITH CONTROLLER TO MOVE IMAGE SENSOR OR LENS ASSEMBLY

CROSS REFERENCE TO RELATED APPLICATIONS

This application is the National Phase of PCT/KR2019/005908 filed on May 17, 2019, which claims priority under 35 U.S.C. § 119(a) to Patent Application No. 10-2018-0057410 filed in the Republic of Korea on May 18, 2018, all of which are hereby expressly incorporated by reference into the present application.

TECHNICAL FIELD

Embodiments relate to a camera module.

BACKGROUND ART

People who use portable devices demand optical devices that have high resolution, are small, and have various photographing functions. As examples of various photographing functions, there are an optical zoom-in/zoom-out function, an auto-focusing (AF) function, and a hand-tremor compensation or optical image stabilizer (OIS) function.

The auto-focusing function and the hand-tremor compensation function are performed by moving or tilting several lens modules, which are fixed to a lens holder so as to be aligned with an optical axis, along the optical axis or in a direction perpendicular to the optical axis, and a separate lens-moving apparatus is used to move the lens modules.

In particular, the conventional OIS function is required to compensate for all types of hand tremor (or shaking) occurring in optical devices.

DISCLOSURE

Technical Problem

Embodiments provide a camera module capable of compensating for various types of hand tremor.

Technical Solution

A camera module according to an embodiment may include a lens assembly including a plurality of solid lenses, an image sensor disposed on the optical axis of the plurality of solid lenses, a liquid lens disposed on the optical axis and disposed on the image sensor, and a controller configured to move the image sensor in a direction perpendicular to the optical axis.

For example, the liquid lens may include a conductive liquid and a non-conductive liquid that form an interface therebetween, and the controller may change the position or shape of the interface or may change the position of at least one solid lens among the plurality of solid lenses.

For example, the liquid lens may include a conductive liquid and a non-conductive liquid that form an interface therebetween. When the image sensor moves in a first direction, one solid lens among the plurality of solid lenses may move in a second direction.

For example, the liquid lens may include first and second liquids that are in contact with each other to form an interface. The second liquid may be disposed closer to the image sensor than the first liquid, and the direction in which the interface is tilted may vary depending on the direction in which the image sensor moves in a direction perpendicular to the optical axis.

For example, the refractive index of the second liquid may be greater than the refractive index of the first liquid, the image sensor may move from a first position to a second position in a direction perpendicular to the optical axis, and in a direction parallel to the optical axis, the shortest distance between the interface and the second position of the image sensor may be shorter than the shortest distance between the interface and the first position of the image sensor.

For example, the refractive index of the first liquid may be greater than the refractive index of the second liquid, the image sensor may move from a first position to a second position in a direction perpendicular to the optical axis, and in a direction parallel to the optical axis, the shortest distance between the interface and the first position of the image sensor may be shorter than the shortest distance between the interface and the second position of the image sensor.

For example, the solid lens, controlled in position by the controller, may include a convex lens, and the image sensor and the convex lens may be controlled so as to move in different directions from each other.

For example, the camera module may include a moving body configured to move the image sensor, and the image sensor may receive power via the moving body.

For example, the camera module may further include a driving unit and a moving body configured to move the image sensor, and power may be applied to the driving unit so as to move the image sensor via the moving body.

For example, the moving body may be a ball or a wire.

For example, the camera module may include a moving substrate on which the image sensor is disposed and a fixed substrate disposed below the moving substrate, and the moving body may be disposed between the fixed substrate and the moving substrate.

For example, the camera module may include a moving substrate on which the image sensor is disposed and a fixed substrate disposed below the moving substrate, and the moving body may connect the fixed substrate and the moving substrate.

For example, the camera module may further include a moving substrate on which the image sensor is disposed, a fixed substrate disposed below the moving substrate, and a ball disposed between the moving substrate and the fixed substrate.

For example, the fixed substrate may include a first accommodation recess in which the ball is disposed, and the moving substrate may include a second accommodation recess in which the ball is disposed.

For example, the camera module may further include a viscous body, which is disposed in the first accommodation recess or the second accommodation recess and is in contact with the ball.

For example, the viscous body may be a conductive fluid.

For example, the camera module may include a first magnet disposed on one of the moving substrate and the fixed substrate and a coil disposed on the other one of the moving substrate and the fixed substrate.

For example, the camera module may further include a detection sensor, disposed on one of the moving substrate and the fixed substrate to detect the amount of movement or the amount of rotation of the image sensor, and a sensing magnet, secured to the other one of the moving substrate and the fixed substrate and disposed at a position corresponding to the Hall sensor.

For example, the ball may electrically connect the moving substrate and the fixed substrate.

For example, the camera module may further include a sensing unit configured to detect horizontal movement or rotational movement of the camera module, and the controller may move the image sensor using information received from the sensing unit.

A camera module according to another embodiment may include a lens assembly including a plurality of solid lenses, an image sensor disposed on the optical axis of the plurality of solid lenses, a liquid lens disposed above the image sensor on the optical axis, and a controller configured to move the lens assembly in a direction perpendicular to the optical axis. The liquid lens may include a conductive liquid and a non-conductive liquid that form an interface therebetween, and the controller may change the position or shape of the interface or may change the position of at least one solid lens among the plurality of solid lenses.

For example, when the lens assembly moves in a first direction, one solid lens among the plurality of solid lenses may move in a second direction, and may tilt the interface of the liquid lens.

Advantageous Effects

A camera module according to an embodiment is capable of effectively compensating for shaking (or hand tremor) of a device including a camera module by moving one or more among a lens assembly, a solid lens, a liquid lens, and an image sensor.

It is possible to compensate for shaking caused by rotation about an optical axis, to realize a reduced thickness, and to enable electrically stable connection between elements.

The effects achievable through the embodiments are not limited to the above-mentioned effects, and other effects not mentioned herein will be clearly understood by those skilled in the art from the following description.

DESCRIPTION OF DRAWINGS

FIG. 1 illustrates a schematic block diagram of a camera module according to an embodiment.

FIG. 2 illustrates a cross-sectional view according to an embodiment of a liquid lens module including the liquid lens shown in FIG. 1.

FIGS. 3A to 3E are conceptual diagrams for explaining the operations according to an embodiment.

FIGS. 4A to 4C are diagrams for explaining the operations of a driving unit according to an embodiment.

FIG. 5 is a graph for explaining distortion compensation of the camera module according to the embodiment.

FIGS. 6A and 6B are diagrams for explaining the relationship between first operation and fourth operation.

FIGS. 7A and 7B are diagrams for explaining the relationship between the first operation and third operation.

FIG. 8 is a diagram for explaining an embodiment of the first driving unit shown in FIG. 1.

FIG. 9 illustrates a block diagram of an embodiment of the distance measurement unit shown in FIG. 1.

FIG. 10 illustrates a top perspective view of the coupled state of an embodiment of the camera module shown in FIG. 1.

FIG. 11 illustrates a top perspective view of the camera module shown in FIG. 10, from which a cover is removed.

FIG. 12 illustrates an exploded perspective view of the camera module shown in FIG. 10.

FIG. 13 illustrates a cross-sectional view taken along line I-I' in the camera module shown in FIG. 10.

FIG. 14 illustrates an exploded perspective view of a portion of the camera module shown in FIG. 10.

FIG. 15 illustrates an exploded perspective view of a portion of the camera module shown in FIG. 10.

FIG. 16 illustrates a cross-sectional view of a camera module according to another embodiment.

FIG. 17 illustrates a cross-sectional view of a camera module according to still another embodiment.

FIG. 18 illustrates a cross-sectional view of a camera module according to still another embodiment.

FIG. 19 is a diagram for explaining shaking of an optical device including the camera module according to the embodiment.

BEST MODE

Hereinafter, exemplary embodiments will be described in detail with reference to the accompanying drawings. While the disclosure is susceptible to various modifications and alternative forms, specific embodiments thereof are shown by way of example in the drawings. However, the disclosure should not be construed as being limited to the embodiments set forth herein, but on the contrary, the disclosure is to cover all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be directly on or under the other element, or can be indirectly formed such that one or more intervening elements are also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element, without necessarily requiring or involving any physical or logical relationship or sequence between such subjects or elements.

Hereinafter, a camera module 100 (100A to 100D) and an optical device 600 according to embodiments will be described using the Cartesian coordinate system, but the embodiments are not limited thereto. That is, in the Cartesian coordinate system, the x-axis, the y-axis and the z-axis are perpendicular to one another, but the embodiments are not limited thereto. That is, the x-axis, the y-axis, and the z-axis may cross one another, rather than being perpendicular to one another.

FIG. 1 illustrates a schematic block diagram of a camera module 100 according to an embodiment.

The camera module 100 shown in FIG. 1 may include a lens assembly 110 and an image sensor 130, and may further include a liquid lens 120.

The camera module 100 shown in FIG. 1 may include a lens assembly 110, a liquid lens 120, and an image sensor 130, and may include at least one of a sensing unit 140, a driving unit 150, a controller 160, or a distance measurement unit 170.

The lens assembly 110 may include a plurality of lenses. For example, as shown in FIG. 1, the plurality of lenses may include four lenses L1, L2, L3 and L4, but the embodiment is not limited as to the specific number of lenses included in the lens assembly 110. That is, the lens assembly 110 may include three or fewer lenses or five or more lenses.

In addition, the plurality of lenses included in the lens assembly 110 may include convex lenses L1 to L4, as shown in FIG. 1. Unlike the illustrated configuration, concave lenses may be included, or a combination including at least one of a convex lens, a concave lens, or an aspherical lens may be included.

In addition, the plurality of lenses included in the lens assembly 110 may include at least one of a solid lens or a liquid lens. That is, the liquid lens may be included inside the lens assembly 110, or may be disposed outside (e.g. above or below) the lens assembly 110.

According to an embodiment, all of the lenses L1 to L4 included in the lens assembly 110 may be solid lenses. In this case, as shown in FIG. 1, the liquid lens 120 may be disposed outside the lens assembly 110. Further, although the liquid lens 120 is illustrated in FIG. 1 as being disposed between the rear end of (i.e. below) the lens assembly 110 and the image sensor 130, the embodiment is not limited thereto. That is, according to another embodiment, the liquid lens 120 may be disposed on the front end of (i.e. above) the lens assembly 110. In this case, the light that has passed through the liquid lens 120 may be incident on the lens assembly 110, and the light that has passed through the lens assembly 110 may be incident on the image sensor 130.

According to another embodiment, unlike what is illustrated in FIG. 1, the lens assembly 110 may include both the lenses L1 to L4, which are solid lenses, and the liquid lens 120. When the liquid lens 120 shown in FIG. 1 is contained in the lens assembly 110, the liquid lens 120 may be disposed in front of or behind the solid lenses L1 to L4, or may be disposed between the lenses L1 to L4. That is, the liquid lens 120 may be disposed on the front end A1 of the first lens L1, may be disposed on the rear end A5 of the fourth lens L4, or may be disposed in a region A2, A3 or A4 between the first to fourth lenses L1 to L4.

The liquid lens 120 or the image sensor 130 may be disposed along an optical axis LX of at least one of the lenses L1 to L4. Alternatively, the camera module 100 shown in FIG. 1 may not include the liquid lens 120.

Further, although not shown, an aperture (not shown) may be disposed on the front end A1 or the rear end A5 of the lenses, or may be disposed in the region A2, A3 or A4 between the lenses L1 to L4.

Hereinafter, the liquid lens 120 shown in FIG. 1 will be described below briefly with reference to the accompanying drawings. The liquid lens 120 and first and second connection substrates 241 and 244 will be described later with reference to FIGS. 10 to 15.

FIG. 2 illustrates a cross-sectional view according to an embodiment of a liquid lens module 200 including the liquid lens 120 shown in FIG. 1.

The liquid lens module 200 shown in FIG. 2 may include the liquid lens and a connection substrate (a first connection substrate 241 or a second connection substrate 244).

The liquid lens may be an optical member that includes at least one liquid and controls the path of light that passes through the liquid lens using variation in the shape of the liquid. Further, the liquid lens may include a plurality of different types of liquids LQ1 and LQ2 and a first plate 247 having therein a cavity CA in which the different types of liquids LQ1 and LQ2 are disposed. In addition, the liquid lens may further include at least one of a second plate 245, a third plate 246, an electrode (e.g. at least one of first and second electrodes E1 and E2), or an insulation layer 248.

Although not illustrated, the liquid lens may further include an optical layer. In this case, the optical layer may serve as a filter 550 in a camera module 100A shown in FIGS. 10 to 15.

The liquids LQ1 and LQ2 may be accommodated in the cavity CA in the first plate 247, and may include a first liquid (or an insulative liquid) LQ1, which is non-conductive, and a second liquid LQ2, which is conductive. The first liquid LQ1 and the second liquid LQ2 may be immiscible with each other, and an interface (or a boundary surface) BO may be formed at the contact portion between the first and second liquids LQ1 and LQ2. The interface BO formed by the two liquids LQ1 and LQ2 may be moved along an inclined surface i of the cavity CA by a driving voltage supplied to the first electrode E1 and/or the second electrode E2 via the first connection substrate 241 and/or the second connection substrate 244.

The inner side surface of the first plate 247 may form an inclined sidewall i of the cavity CA. The first plate 247 may include upper and lower openings having a predetermined inclined surface i. The open area in the direction in which light is introduced into the cavity CA may be smaller than the open area in the opposite direction. Alternatively, the cavity CA may be formed such that the inclination direction thereof is opposite what is illustrated.

The first liquid LQ1 and the second liquid LQ2 are charged, accommodated, or disposed in the cavity CA in the first plate 247. In addition, the cavity CA is the area through which light passes, and the first plate 247 may be formed of a transparent material, or may include impurities so that light does not easily pass therethrough.

Electrodes may be disposed respectively on one surface and the other surface of the first plate 247. A plurality of first electrodes E1 may be spaced apart from a second electrode E2, and may be disposed on one surface (e.g. the upper surface, the side surface, and the lower surface) of the first plate 247. The second electrode E2 may be disposed on at least a portion of the other surface (e.g. the lower surface) of the first plate 247, and may be in direct contact with the second liquid LQ2. To this end, a portion of the second electrode E2 disposed on the other surface of the first plate 247 may be exposed to the second liquid LQ2, which is conductive.

In addition, the second plate 245 may be disposed on one surface of the first electrodes E1. That is, the second plate 245 may be disposed above the first plate 247. Specifically, the second plate 245 may be disposed above the upper surface of the first electrodes E1 and the cavity CA.

Each of the first and second electrodes E1 and E2 may include at least one electrode sector. For example, the first electrodes E1 may include two or more electrode sectors, and the second electrode E2 may include at least one electrode sector. For example, the plurality of first electrodes E1 may include a plurality of electrode sectors sequentially disposed in the clockwise direction (or in the counterclockwise direction) about the optical axis.

In addition, the liquid lens module 200 shown in FIG. 2 may further include a bonding member 249. The bonding member (or adhesive) 249 may be disposed between the first plate 247 and the third plate 246, and may serve to engage the first plate 247 and the third plate 246 with each other.

Alternatively, the liquid lens module 200 shown in FIG. 2 may further include a plate leg 249, rather than the bonding member 249. The plate leg 249 is disposed between the first plate 247 and the third plate 246, and serves to support the third plate 246. Here, the plate leg 249 may be made of the same material as the third plate 246, and may be integrally formed therewith.

Hereinafter, the case in which the plate leg 249 is integrally formed with the third plate 246 will be described. However, the following description may also apply to the case in which the plate leg 249 is provided separately from the third plate 246.

The third plate 246 may be disposed on one surface of the second electrode E2. That is, the third plate 246 may be disposed below the first plate 247. Specifically, the third plate 246 may be disposed below the lower surface of the second electrode E2 and the cavity CA. The second plate 245 and the third plate 246 may be disposed so as to face each other, with the first plate 247 interposed therebetween. In addition, at least one of the second plate 245 or the third plate 246 may be omitted. Each of the second and third plates 245 and 246 is an area through which light passes, and may be formed of a light-transmitting material.

The insulation layer 248 may be disposed so as to cover a portion of the lower surface of the second plate 245 in the upper area of the cavity CA. That is, the insulation layer 248 may be disposed between the first liquid LQ1 and the first plate 247. In addition, the insulation layer 248 may be disposed so as to cover a portion of the first electrode E1, which forms the sidewall of the cavity CA. In addition, the insulation layer 248 may be disposed on the lower surface of the first plate 247 so as to cover a portion of the first electrode E1, the first plate 247, and the second electrode E2. The insulation layer 248 may cover one electrode among the first and second electrodes E1 and E2 (e.g. the first electrode E1), and may expose a portion of the other electrode (e.g. the second electrode E2) so that electrical energy is applied to the second liquid LQ2, which is conductive.

The configuration in FIG. 2 is just an example for helping understanding of the liquid lens 120 shown in FIG. 1. The liquid lens 120 included in the camera module 100 according to the embodiment may be implemented in various forms, and thus is not limited to the configuration shown in FIG. 2.

Meanwhile, referring again to FIG. 1, the image sensor 130 may be aligned with the lenses L1 to L4 and the liquid lens 120 along the optical axis LX. The image sensor 130 may perform a function of converting the light that has passed through the lens assembly 110 and the liquid lens 120 into image data. More specifically, the image sensor 130 may generate image data by converting light into analog signals via a pixel array including a plurality of pixels and synthesizing digital signals corresponding to the analog signals.

The sensing unit 140 may detect shaking (or hand tremor) caused by at least one of movement of the camera module 100 in the horizontal direction perpendicular to the optical axis LX (602 and 604 shown in FIG. 19), tilting of the camera module 100 with respect to the horizontal direction (608 and 610 shown in FIG. 19), or tilting (or rotation) of the camera module 100 with respect to the optical axis LX (612 shown in FIG. 19), and may output the result of detection to the controller 160. Here, when the optical axis LX is parallel to the z-axis, at least one of the x-axis direction or the y-axis direction, which is perpendicular to the z-axis direction, may be a 'horizontal direction'. The sensing unit 140 may detect horizontal movement or rotational movement of the camera module 100, and the controller 160 may move the image sensor 130 using information received from the sensing unit 140.

For example, the sensing unit 140 may include at least one of first to fifth sensing units 141 to 149.

The first sensing unit 141 detects movement of the camera module 100 in the first direction (e.g. the x-axis direction), which is one of the horizontal directions, and outputs the result of detection to the controller 160.

The second sensing unit 143 detects movement of the camera module 100 in the second direction (e.g. the y-axis direction), which is another one of the horizontal directions and crosses the first direction (e.g. the x-axis direction), and outputs the result of detection to the controller 160.

For the above-described operation, each of the first and second sensing units 141 and 143 may be implemented as one acceleration sensor in order to detect the movement that each of the first and second sensing units 141 and 143 is supposed to detect.

The third sensing unit 145 detects tilting of the camera module 100 with respect to the first direction (e.g. the x-axis direction), and outputs the result of detection to the controller 160. Here, the tilting of the camera module 100 with respect to the first direction is rotation 608 of the camera module 100 about the first direction (e.g. the x-axis direction), as shown in FIG. 19.

The fourth sensing unit 147 detects tilting of the camera module 100 with respect to the second direction (e.g. the y-axis direction), and outputs the result of detection to the controller 160. Here, the tilting of the camera module 100 with respect to the second direction is rotation 610 of the camera module 100 about the second direction (e.g. the y-axis direction), as shown in FIG. 19.

The fifth sensing unit 149 detects rotation of the camera module 100 about the optical axis LX or a direction parallel to the optical axis LX (e.g. the z-axis direction), and outputs the result of detection to the controller 160.

For the above-described operation, each of the third to fifth sensing units 145, 147 and 149 may be implemented as one gyro sensor in order to detect the movement that each of the third to fifth sensing units 145, 147 and 149 is supposed to detect. That is, the sensing unit 140 may include at least one of an acceleration sensor or a gyro sensor.

The controller 160 generates a control signal in response to the result of detection by the sensing unit 140 and outputs the generated control signal to the driving unit 150.

In response to the control signal output from the controller 160, the driving unit 150 may perform one of first, second, third, fourth and fifth operations, or may perform at least two of the first, second, third, fourth and fifth operations in a combined manner, thereby compensating for shaking of the camera module 100.

The first operation is an operation of moving the image sensor 130 in a direction perpendicular to the optical axis LX (e.g. the horizontal direction). In addition, the second operation is an operation of moving the lens assembly 110 in the horizontal direction. The third operation is an operation of changing the position or shape of the interface BO of the liquid lens 120 (e.g. tilting). The fourth operation is an operation of moving one of the lenses L1 to L4 included in the lens assembly 110 in the horizontal direction. The fifth operation is an operation of rotating the image sensor 130 about the optical axis LX.

Among the plurality of lenses, the lens that the driving unit 150 moves in the horizontal direction in order to perform the fourth operation may be a lens disposed adjacent to the aperture. However, the embodiment is not limited thereto. For example, when the aperture is located in the region A2 or A3 shown in FIG. 1, the fourth operation may be performed using the second lens L2, among the plurality of lenses L1 to L4. Hereinafter, the case in which the second lens L2 is moved in order to perform the fourth operation will be described. However, the following description may identically apply to the case in which the first, third or fourth lens L1, L3 or L4 is moved.

According to the embodiment, the controller 160 may compensate for shaking of the camera module 100 through the first operation or the second operation. For example, the controller 160 may control the driving unit 150 to move the image sensor 130 or the lens assembly 110 in the horizontal direction, thereby implementing the hand-tremor compensation function of the camera module 100. The driving unit 150 may be an actuator. The driving unit 150 may be a part that generates force for moving the image sensor 130 or the lens assembly 110 in the horizontal direction. For example, the driving unit 150 may include a coil and a magnet, which generate driving force. In this case, one of the coil and the magnet may be disposed on one of a moving member and a fixed member, and the other one of the coil and the magnet may be disposed on the other one of the moving member and the fixed member. In addition, the controller 160 may compensate for shaking of the camera module 100 by performing at least one of the third operation or the fourth operation. Since distortion caused by shaking compensation through the first or second operation and distortion caused by shaking compensation through the third or fourth operation cancel each other, it is possible to more accurately compensate for shaking of the camera module 100 by performing two or more of the first to fourth operations in a combined manner.

FIGS. 3A to 3E are conceptual diagrams for explaining the operations according to an embodiment. In each of FIGS. 3C to 3E, the dotted line 310 represents the state of incident light before the camera module 100 is shaken, and the solid lines 302 to 306 represent the state of incident light after the camera module 100 is shaken. In addition, a liquid lens 120A shown in each of FIGS. 3C to 3E corresponds to the liquid lens 120 shown in FIG. 2. For better understanding, in FIGS. 3C to 3E, only the interface BO of the liquid lens 120A and the first and second liquids LQ1 and LQ2 are schematically illustrated. In addition, a member 122 disposed between the liquid lens 120A and the image sensor 130 in each of FIGS. 3C to 3E may be the base substrate 530 shown in FIGS. 10 to 15, which will be described later, without being limited thereto, or may be omitted.

According to an embodiment, as shown in FIG. 3A, the driving unit 150 may perform the second operation of moving the lens assembly 110 in the direction of the arrow AR1 and the fourth operation of moving one (e.g. L2) of the lenses L1 to L4 in the direction of the arrow AR2 in a combined manner. At this time, the image sensor 130 may be fixed so as to be immobile.

According to another embodiment, as shown in FIG. 3B, the driving unit 150 may perform the first operation of moving the lens assembly 130 in the direction of the arrow AR3 and the fourth operation of moving one (e.g. L2) of the lenses L1 to L4 in the direction of the arrow AR2 in a combined manner. At this time, the lens assembly 110 may be fixed so as to be immobile.

According to still another embodiment, as shown in FIGS. 3C and 3D, the driving unit 150 may perform the second operation of moving the lens 110 in the direction of the arrow AR1 and the third operation of tilting the interface BO of the liquid lens 120A in a combined manner. At this time, the image sensor 130 may be fixed so as to be immobile. In the case of FIG. 3C, the liquid lens 120A is disposed inside the lens assembly 110, unlike what is illustrated in FIG. 1. In the case of FIG. 3D, the liquid lens 120A is disposed outside the lens assembly 110, as shown in FIG. 1. Accordingly, in the case of FIG. 3C, when the lens assembly 110 moves in the direction of the arrow AR1, the liquid lens 120A may also move in the direction of the arrow AR1. In contrast, in the case of FIG. 3D, when the lens assembly 110 moves in the direction of the arrow AR1, the liquid lens 120A does not move in the direction of the arrow AR1. Except therefor, the operations of the driving unit 150 shown in FIGS. 3C and 3D are identical.

According to still another embodiment, as shown in FIG. 3E, the driving unit 150 may perform the first operation of moving the image sensor 130 in the direction of the arrow AR3 and the third operation of tilting the interface BO of the liquid lens 120A in a combined manner. In this case, the lens assembly 110 may not move.

The driving unit 150 is capable of more effectively compensating for shaking of the camera module 100 when performing at least two of the first, second, third, or fourth operation in a combined manner than when performing only one of the first to fourth operations. This will be described below in detail with reference to FIGS. 4A to 4C and FIG. 5.

For better understanding, it is assumed that the camera module 100 is shaken while being tilted by 1° with respect to the y-axis direction. At this time, the sensing unit 140 (e.g. the fourth sensing unit 147) detects the tilting of the camera module 100 with respect to the y-axis direction, and outputs the result of detection to the controller 160. The controller 160 may control the operation of the driving unit 150 as follows according to the result of detection by the sensing unit 140.

FIGS. 4A to 4C are diagrams for explaining the operations of the driving unit 150 according to the embodiment. In each of FIGS. 4A and 4B, the dotted line 310 represents the state of incident light in a non-shaken state of the camera module 100, and the solid lines 320 and 330 represent the state of incident light in the shaken state of the camera module 100. In addition, a liquid lens 120A shown in FIG. 4B corresponds to the liquid lens shown in FIG. 2. For better understanding, only the interface BO and the first and second liquids LQ1 and LQ2 are schematically illustrated. In addition, for description of the concept, the lens assembly 110 is schematically illustrated using an arrow in FIG. 4A.

As shown in FIG. 4A, the driving unit 150 may perform the first operation of moving the image sensor 130 in the y-axis direction indicated by the arrow AR3, or may perform the second operation of moving the lens assembly 110 in the y-axis direction indicated by the arrow AR1. The lens assembly 110 may be fixed while the first operation of moving the image sensor 130 is performed, and the image sensor 130 may be fixed while the second operation of moving the lens assembly 110 is performed. However, both the lens assembly 110 and the image sensor 130 may be moved during any operation.

Described in detail, when the camera module 100 is shaken while being tilted by 1° with respect to the y-axis direction, light 320 is incident on the center P1 of the image sensor 130 in the state of being tilted by 1°, which is a first angle θ1, and thus the first angle needs to be corrected to 0°. The light 320 is incident on one peripheral portion P2 of the image sensor 130 in the state of being tilted by 31°, which is a second angle θ2, and thus the second angle needs to be corrected to 30°, which is a third angle θ3. The light 320 is incident on an opposite peripheral portion P3 of the image sensor 130 in the state of being tilted by 29°, which is a fourth angle θ4, and thus the fourth angle needs to be corrected to 30°, which is a fifth angle θ5. In this way, the image sensor 130 or the lens assembly 110 is moved on the basis of an image projected onto the image sensor 130.

When the first angle θ1 of 1° is corrected to 0°, a first amount of movement M1 at the center P1 of the image sensor 130 may be expressed using Equation 1 below. When the second angle θ2 of 31° is corrected to the third angle θ3 of 30°, a second amount of movement M2 at the one peripheral portion P2 of the image sensor 130 may be expressed using Equation 2 below. When the fourth angle θ4 of 29° is corrected to the fifth angle θ5 of 30°, a third amount of movement M3 at the opposite peripheral portion P3 of the image sensor 130 may be expressed using Equation 3 below.

$$M1 = FL \times (\tan 1 - \tan 0) \quad \text{[Equation 1]}$$

$$M2 = FL \times (\tan 31 - \tan 30) \quad \text{[Equation 2]}$$

$$M3 = FL \times (\tan(-29) - \tan(-30)) \quad \text{[Equation 3]}$$

Here, FL represents the focal length. When FL is 3.7 mm, the first amount of movement M1 is about 65 μm, the second amount of movement M2 is about 87 μm, and the third amount of movement M3 is about 85 μm. On the basis of the first amount of movement M1 of the light incident on the center P1, the second amount of movement M2 causes distortion of +22 μm, and the third amount of movement M3 causes distortion of +20 μm.

Meanwhile, the driving unit 150 may further perform the third or fourth operation. That is, the driving unit 150 may perform the third operation of tilting the interface BO of the liquid lens 120A, as shown in FIG. 4B, or may perform the fourth operation of moving any one (L2) of the lenses L1 to L4 included in the lens assembly 110 in the y-axis direction indicated by the arrow AR2, as shown in FIG. 4C. While the third operation of tilting the interface BO of the liquid lens 120A is performed, the image sensor 130 may be fixed, and while the fourth operation of moving any one lens L2 is performed, the image sensor 130 may be fixed. However, the embodiment is not limited thereto, and the image sensor may be moved in any operation. Furthermore, the third or fourth operation may be performed simultaneously with the first or second operation, or may be performed with a time difference therebetween.

Describing the third operation, when the camera module 100 is shaken while being tilted by approximately 1° with respect to the y-axis direction and the interface BO of the liquid lens 120A is tilted by a predetermined angle θ6, e.g. 8.76°, the angle at which light is incident on the center P1 of the image sensor 130 is corrected from 1° to 0°. However, the second angle θ2 at which light is incident on the one peripheral portion P2 is corrected from 31° to −29.67°, rather than being corrected to 30°, which is the third angle θ3, and the fourth angle θ4 at which light is incident on the opposite peripheral portion P3 of the image sensor 130 is corrected from 29° to 30.16°, rather than being corrected to 30°, which is the fifth angle θ5. In this case, the one peripheral portion P2 undergoes distortion of −27 μm, and the opposite peripheral portion P3 undergoes distortion of −14 μm. In this way, when the third operation is performed, the peripheral portions P2 and P3 of the image sensor 130 are corrected less than the center P1 thereof. Similarly, when the fourth operation shown in FIG. 4C is performed, the peripheral portions P2 and P3 of the image sensor 130 are corrected less than the center P1 thereof.

FIG. 5 is a graph for explaining distortion compensation of the camera module 100 according to the embodiment, in which the horizontal axis represents the position of the field in the image sensor 130 and the vertical axis represents the degree of distortion as the number of pixels.

As described above, when the driving unit 150 performs the first or second operation, the peripheral portions P2 and P3 of the image sensor 130 are corrected more than the center P1 thereof, whereas when the driving unit 150 performs the third or fourth operation, the peripheral portions P2 and P3 of the image sensor 130 are corrected less than the center P1 thereof. Therefore, when the driving unit 150 performs one of the first and second operations and one of the third and fourth operations in a combined manner, distortion 342 caused by the first or second operation and distortion 344 caused by the third or fourth operation may cancel each other, as shown in FIG. 5. In the example described above, at the one peripheral portion P2 of the image sensor 130, when the distortion of +22 μm caused by the first or second operation and the distortion of −27 μm caused by the third operation are summed, the distortion may be reduced to −5 μm. At the opposite peripheral portion P3 of the image sensor 130, when the distortion of +20 μm caused by the first or second operation and the distortion of −14 μm caused by the third operation are summed, the distortion may be reduced to +6 μm.

As such, since the distortion 340 (e.g. −5 μm or +6 μm) caused by performing the first or second operation and the third or fourth operation according to the embodiment is less than the distortion 342 (e.g. +22 μm or 20 μm) caused by performing only the first or second operation or the distortion 344 (e.g. −27 μm or −14 μm) caused by performing only the third or fourth operation, it can be seen that the embodiment more effectively compensates for shaking of the camera module 100.

The description made with reference to FIGS. 4A to 4C and 5 may identically apply to the case in which the camera module 100 is shaken while being tilted by approximately 1° with respect to the x-axis direction. In this case, the sensing unit 140 (e.g. the third sensing unit 145) detects tilting of the camera module 100 with respect to the x-axis direction and outputs the result of detection to the controller 160. The controller 160 may control the operation of the driving unit 150 based on the result of detection by the sensing unit 140, as described above.

Meanwhile, the camera module 100 may be shaken by being rotated about the optical axis LX (e.g. in the z-axis direction). At this time, the sensing unit 140 (e.g. the fifth sensing unit 149) detects shaking of the camera module 100 attributable to rotation of the camera module 100 about the optical axis LX and outputs the result of detection to the controller 160. The controller 160 generates, based on the result of detection by the fifth sensing unit 149, a control signal such that the driving unit 150 performs the fifth operation. The driving unit 150 rotates the image sensor 130 about the optical axis LX in response to the control signal, thereby compensating for shaking of the camera module 100.

Hereinafter, the relationships between the operations performed in a combined manner by the driving unit 150 will be described with reference to the accompanying drawings.

FIGS. 6A and 6B are diagrams for explaining the relationship between the first operation and the fourth operation.

When the driving unit 150 performs the first operation of moving the image sensor 130 in the direction of the arrow AR3 and the fourth operation of moving one (e.g. L2) of the lenses L1 to L4 in a combined manner, if the lens L2 that is moved by the fourth operation is a convex lens, the direction in which the image sensor 130 is moved by the first operation and the direction in which the convex lens L2 is moved by the fourth operation may be opposite each other. For example, as shown in FIG. 6A, when the image sensor 130 is moved in the +y-axis direction (or the +x-axis direction) indicated by the arrow AR3, the convex lens L2 may be moved in the −y-axis direction (or the −x-axis direction) indicated by the arrow AR2. Alternatively, as shown in FIG. 6B, when the image sensor 130 is moved in the −y-axis direction (or the −x-axis direction) indicated by the arrow AR3, the convex lens L2 may be moved in the +y-axis direction (or the +x-axis direction) indicated by the arrow AR2.

FIGS. 7A and 7B are diagrams for explaining the relationship between the first operation and the third operation.

When the driving unit 150 performs the first operation of moving the image sensor 130 in the direction of the arrow AR3 and the third operation of tilting the interface BO of the liquid lens 120A in a combined manner, the direction in which the interface BO is tilted may vary depending on the direction in which the image sensor 130 is moved by the first operation.

According to an embodiment, when the refractive index of the second liquid LQ2 is greater than the refractive index of the first liquid LQ1, the direction in which the interface BO is tilted may vary as follows depending on the direction in which the image sensor 130 is moved by the first operation.

As shown in FIG. 7A, when the image sensor 130 is moved from the first position ① to the second position ② in the horizontal direction (e.g. the +y-axis direction or the +x-axis direction) by the first operation, the interface BO may be tilted such that the distance between the interface BO and the upper surface 130T of the image sensor 130 gradually decreases from the first position ① to the second position ② of the image sensor 130. That is, the first distance d1 between the interface BO and the upper surface 130T of the image sensor 130 at the first position ① may be greater than the second distance d2 between the interface BO and the upper surface 130T of the image sensor 130 at the second position ②. That is, in the direction parallel to the optical axis LX (e.g. the z-axis direction), the shortest distance between the interface BO and the second position ② of the image sensor 130 may be shorter than the shortest distance between the interface BO and the first position ① of the image sensor 130.

Alternatively, as shown in FIG. 7B, when the image sensor 130 is moved from the second position ② to the first position ① in the horizontal direction (e.g. the −y-axis direction or the −x-axis direction) by the first operation, the interface BO may be tilted such that the distance between the interface BO and the upper surface 130T of the image sensor 130 gradually decreases from the second position ② to the first position ① of the image sensor 130. That is, the second distance d2 between the interface BO and the upper surface 130T of the image sensor 130 at the second position ② may be greater than the first distance d1 between the interface BO and the upper surface 130T of the image sensor 130 at the first position ①.

According to another embodiment, when the refractive index of the first liquid LQ1 is greater than the refractive index of the second liquid LQ2, the direction in which the interface BO is tilted may vary in the direction opposite the direction shown in FIGS. 7A and 7B depending on the direction in which the image sensor 130 is moved by the first operation.

Unlike what is illustrated in FIG. 7A, when the image sensor 130 is moved from the first position ① to the second position ② in the horizontal direction (e.g. +y-axis direction or the +x-axis direction) by the first operation, the interface BO may be tilted such that the distance between the interface BO and the upper surface 130T of the image sensor 130 gradually increases from the first position ① to the second position ② of the image sensor 130. That is, the first distance d1 between the interface BO and the upper surface 130T of the image sensor 130 at the first position ① may be less than the second distance d2 between the interface BO and the upper surface 130T of the image sensor 130 at the second position ②. That is, in the direction parallel to the optical axis LX (e.g. the z-axis direction), the shortest distance between the interface BO and the first position ① of the image sensor 130 may be shorter than the shortest distance between the interface BO and the second position ② of the image sensor 130.

Alternatively, unlike what is illustrated in FIG. 7B, when the image sensor 130 is moved from the second position ② to the first position ① in the horizontal direction (e.g. the −y-axis direction or the −x-axis direction) by the first operation, the interface BO may be tilted such that the distance between the interface BO and the upper surface 130T of the image sensor 130 gradually increases from the second position ② to the first position ① of the image sensor 130. That is, the second distance d2 between the interface BO and the upper surface 130T of the image sensor 130 at the second position ② may be less than the first distance d1 between the interface BO and the upper surface 130T of the image sensor 130 at the first position ①.

As described above, when the interface BO of the liquid lens 120 is tilted, the angle θ6 by which the interface BO of the liquid lens 120A is tilted with respect to a horizontal surface perpendicular to the optical axis LX (e.g. the surface formed by the x-axis and the y-axis) may be 20° or less, but the embodiment is not limited thereto.

Meanwhile, referring again to FIG. 1, the driving unit 150 may include at least one of first to third driving units 152, 154 and 156, or a single driving unit may serve as the first to third driving units 152, 154 and 156.

The first driving unit 152 may perform at least one of the first operation or the fifth operation. That is, the first driving unit 152 may perform the first operation by moving the image sensor 130 in the horizontal direction, or may perform the fifth operation by rotating the image sensor 130 about the optical axis LX.

The second driving unit 154 may perform at least one of the second operation or the fourth operation. That is, the second driving unit 154 may perform the second operation by moving the lens assembly 110 in the horizontal direction, and may perform the fourth operation by moving one (e.g. L2) of the lenses L1 to L4 included in the lens assembly 110 in the horizontal direction. To this end, the second driving unit 154 may use microelectromechanical systems (MEMS), a voice coil motor (VCM), a shape memory alloy (SMA), an electro-active polymer (EAP) actuator, a bimetal actuator, or a piezoelectric effect element, but the embodiment is not limited thereto.

The third driving unit 156 may perform the third operation by tilting the interface BO of the liquid lens 120. For example, referring to FIG. 2, when the third driving unit 156 applies a driving voltage to the first and second electrodes E1 and E2 via the first connection substrate 241 and the second connection substrate 244 of the liquid lens 120, the interface BO between the first liquid LQ1 and the second liquid LQ2 is moved along the inclined surface i of the cavity CA and tilted, whereby the third operation may be performed. That is, due to the deformation of the interface BO, at least one of the shape of the liquid lens 120, such as the curvature thereof, or the focal length thereof may be changed (or adjusted). For example, the focal length of the liquid lens 120 may be adjusted when at least one of the flexure or inclination of the interface BO formed inside the liquid lens 120 is changed in response to a driving voltage.

If the controller 160 serves as the third driving unit 156 for tilting the interface BO of the liquid lens 120, the third driving unit 156 may be omitted.

In addition, the camera module 100 may include a moving body for moving the image sensor 130, and the image sensor 130 may receive power via the moving body.

Alternatively, the camera module 100 may include a driving unit and a moving body for moving the image sensor 130, and power may be applied to the driving unit so as to move the image sensor 130 via the moving body. The moving body may be a ball or a wire.

Hereinafter, an embodiment 152A of the first driving unit 152 shown in FIG. 1 will be described with reference to the accompanying drawings.

FIG. 8 is a diagram for explaining the embodiment 152A of the first driving unit 152 shown in FIG. 1, and illustrates the first driving unit 152A, the image sensor 130, and the sensing unit 140.

Referring to FIG. 8, the first driving unit 152A may include a moving substrate 410, a fixed substrate (or a fixed body) 420, an actuator 430, and a connection part 440. Here, the connection part 440 may serve as the aforementioned moving body.

The moving substrate 410 may be disposed below the lens assembly 110 or the liquid lens 120 so as to be moved together with the image sensor 130. That is, when the moving substrate 410 is moved in the horizontal direction, the image sensor 130 may also be moved in the same horizontal direction together therewith, and when the moving substrate 410 is rotated about the optical axis LX, the image sensor 130 may also be rotated together therewith. In addition, the moving substrate 410 may provide an operation voltage, which is required by the image sensor 130, to the image sensor 130, and may be electrically connected to the image sensor 130 in order to receive image data from the image sensor 130.

The fixed substrate 420 may be disposed below the moving substrate 410, and may be fixed so as to be immobile, unlike the moving substrate 410. For example, as shown in FIG. 8, the sensing unit 140 shown in FIG. 1 may be disposed on the fixed substrate 420, but the embodiment is not limited thereto. In addition, the fixed substrate 420 may transfer the aforementioned operation voltage of the image sensor 130 to the moving substrate 410 via the connection part 440, and may receive the image data generated in the image sensor 130 from the moving substrate 410 via the connection part 440.

The actuator 430 may move the moving substrate 410 in the horizontal direction, or may rotate the moving substrate 410 about the optical axis LX under the control of the controller 160. To this end, the actuator 430 may operate in response to the control signal received via an input terminal IN.

The actuator 430 may move the moving substrate 410 in various manners. For example, the actuator 430 may include a first magnet (not shown) and a coil (not shown). In this case, in order to allow the moving substrate 410 to be moved by the electromagnetic interaction between the first magnet and the coil, the first magnet may be disposed so as to be fixed to one of the moving substrate 410 and the fixed substrate 420, and the coil may be disposed so as to be fixed to the other one of the moving substrate 410 and the fixed substrate 420 and to face the first magnet. An embodiment of the first magnet and the coil of the actuator 430 will be described later with reference to FIGS. 10 to 15.

The moving body, i.e. the connection part 440, may be disposed between the moving substrate 410 and the fixed substrate 420, and may allow at least one of the movement of the moving substrate 410 in the horizontal direction or the rotation of the moving substrate 410 about the optical axis LX. In addition, as described above, in order to receive the operation voltage for operating the image sensor 130 from the fixed substrate 420 and transfer the same to the image sensor 130 via the moving substrate 410 and in order to receive image data, which is an electrical signal of an image captured by the image sensor 130, from the moving substrate 410 and transfer the same to the fixed substrate 420, the connection part 440 may be electrically conductive. That is, the connection part 440 may serve to electrically connect the moving substrate 410 and the fixed substrate 420 to each other.

According to the embodiment, the connection part 440 may include a plurality of first bearings. The first bearings 440 may be in point contact with the lower surface 410B of the moving substrate 410 and the upper surface 420T of the fixed substrate 420 in order to allow at least one of the movement of the moving substrate 410 in the horizontal direction or the rotation of the moving substrate 410 about the optical axis LX. Further, in order to electrically connect the moving substrate 410 and the fixed substrate 420 to each other, the first bearings 440 may be made of a conductive material.

Although the number of first bearings 440 is illustrated in FIG. 8 as being three, the embodiment is not limited as to the specific number of first bearings 440, so long as the first bearings 440 are capable of allowing at least one of movement of the moving substrate 410 in the horizontal direction or rotation of the moving substrate 410 about the optical axis LX.

Meanwhile, FIGS. 4A to 4C illustrate compensation for shaking caused by tilting of the camera module 100 in the horizontal direction. In this case, the controller 160 may not use the distance between an object to be photographed and the camera module 100 in order to control the driving unit 150. Therefore, in the case in which it is intended to compensate only for shaking caused by tilting of the camera module 100 shown in FIG. 1 in the horizontal direction, the distance measurement unit 170 shown in FIG. 1 may be omitted.

However, when it is intended to compensate for shaking caused by movement of the camera module 100 in the horizontal direction, the controller 160 may control the driving unit 150 using the distance between the object to be photographed and the camera module 100. This will be described below with reference to the accompanying drawings.

The distance measurement unit 170 shown in FIG. 1 measures the distance between the object to be photographed and the camera module 100 and outputs the measured distance to the controller 160. The controller 160 generates a control signal in consideration of the distance measured by the distance measurement unit 170 and the result of detection by the sensing unit 140 and outputs the generated control signal to the driving unit 150. That is, upon determining that the camera module 100 has moved in the first direction (e.g. the x-axis direction) based on the result of detection by the first sensing unit 141 or that the camera module 100 has moved in the second direction (e.g. the y-axis direction) based on the result of detection by the second sensing unit 143, the controller 160 generates a control signal using the distance measured by the distance measurement unit 170.

According to an embodiment, the distance measurement unit 170 may measure the distance between the object to be photographed and the camera module 100 using a phase difference of light incident on the image sensor 130.

According to another embodiment, the distance measurement unit 170 may be implemented as a distance measurement camera (not shown). The distance measurement camera may measure the distance between the object to be photographed and the camera module 100. To this end, the distance measurement camera may capture an image of the object to be photographed, and may measure the distance between the object to be photographed and the camera module 100 using the captured image.

FIG. 9 illustrates a block diagram of an embodiment 170A of the distance measurement unit 170 shown in FIG. 1, which may include an area measurement unit 172, a tilting amount prediction unit 174, and a distance determination unit 176.

According to another embodiment, the distance measurement unit 170 may be implemented in the form shown in FIG. 9 to measure the distance between the object to be photographed and the camera module 100.

The area measurement unit 172 measures the area of the interface BO of the liquid lens 120 and outputs the measured area of the interface BO to the tilting amount prediction unit 174.

The tilting amount prediction unit 174 predicts the degree of tilting (tilting amount, tilting angle, or curvature) of the interface BO using the area measured by the area measurement unit 172 and outputs the predicted tilting amount to the distance determination unit 176.

The distance determination unit 176 determines the distance between the object to be photographed and the camera module 100 based on the tilting amount predicted by the tilting amount prediction unit 174 and outputs the determined distance to the controller 160 via an output terminal OUT. For example, the distance determination unit 176 may determine the distance by converting the predicted tilting amount into a distance. Further, since the predicted curvature of the interface BO is in one-to-one correspondence with the distance to a corresponding object to be photographed, the distance may be predicted and determined based on the predicted curvature.

According to still another embodiment, the distance measurement unit 170 may calculate the distance between the object to be photographed and the camera module 100 using at least one of first information about the phase difference of light incident on the image sensor 130, second information about an image captured by the distance measurement camera, or third information about the curvature of the interface BO of the liquid lens 120.

According to still another embodiment, a main processor of an optical device (not shown) including the camera module 100 may calculate a distance using at least one of the first, second, or third information, and may directly provide the calculated distance to the controller 160. In this case, the distance measurement unit 170 may be omitted.

Meanwhile, the camera module 100 according to the embodiment may further include a Hall sensor and a second magnet (or a sensing magnet) in order to determine whether the first or fifth operation has been properly performed by the driving unit 150.

The Hall sensor may be fixedly disposed on one of the moving substrate 410 and the fixed substrate 420, and the second magnet may be fixedly disposed on the other one of the moving substrate 410 and the fixed substrate 420 so as to face the Hall sensor. The Hall sensor may detect the amount of movement or amount of rotation of the image sensor 130 due to the first or fifth operation and may output the result of detection to the controller 160. That is, the Hall sensor is a sensor capable of measuring magnetic force. Accordingly, when one of the Hall sensor and the second magnet is disposed on one of the moving substrate 410 and the fixed substrate 420 and the other one of the Hall sensor and the second magnet is disposed on the other one of the moving substrate 410 and the fixed substrate 420, the relative positions of the Hall sensor and the second magnet may be recognized using the magnetic force detected by the Hall sensor, and the amount of movement or amount of rotation of the image sensor 130 may be determined based on the recognized relative positions.

For example, reference numeral 510 shown in FIG. 8 may correspond to the Hall sensor, and 512 may correspond to the second magnet. Reference numeral 510 may correspond to the second magnet, and 512 may correspond to the Hall sensor. In the case illustrated in FIG. 8, the positions 510 and 512, at which the Hall sensor and the second magnet (or the second magnet and the Hall sensor) are respectively disposed, may be respectively located on the lower surface 410B of the moving substrate 410 and the upper surface 420T of the fixed substrate 420, but the embodiment is not limited thereto. That is, the Hall sensor may be disposed on the upper surface, the lower surface, or the side surface of any one of the moving substrate 410 and the fixed substrate 420, or at least a portion of the Hall sensor may be disposed so as to be embedded in any one of the moving substrate 410 and the fixed substrate 420. Similarly, the second magnet may be disposed on the upper surface, the lower surface, or the side surface of the other one of the moving substrate 410 and the fixed substrate 420, or at least a portion of the second magnet may be disposed so as to be embedded in the other one of the moving substrate 410 and the fixed substrate 420. That is, the embodiment is not limited as to the specific positions of the Hall sensor and the second magnet, so long as the Hall sensor and the second magnet are disposed so as to face each other.

Furthermore, although a single Hall sensor and a single second magnet are illustrated in FIG. 8, the embodiment is not limited as to the specific number of Hall sensors or the specific number of second magnets.

Furthermore, the camera module 100 according to the embodiment may use the curvature of the interface BO of the liquid lens 120 in order to determine whether the third operation has been properly performed by the driving unit 150. That is, when the interface BO of the liquid lens 120 is tilted, the amount of tilting may be predicted by measuring the area of the interface BO, and the curvature of the interface BO may also be recognized in the same manner.

The controller 160 generates a control signal based on the amount of movement or amount of rotation detected by the Hall sensor and the predicted amount of tilting of the interface BO, and controls the driving unit 150 using the generated control signal. After determining whether the driving unit 150 has accurately performed the first, third or fifth operation, the controller 160 may control the driving unit 150 to accurately perform the operation based on the result of the determination.

Hereinafter, an embodiment 100A of the camera module 100 illustrated in FIG. 1 will be described with reference to the accompanying drawings.

FIG. 10 illustrates a top perspective view of the coupled state of an embodiment 100A of the camera module 100 shown in FIG. 1, FIG. 11 illustrates a top perspective view of the camera module 100A shown in FIG. 10, from which a cover 510 is removed, FIG. 12 illustrates an exploded perspective view of the camera module 100A shown in FIG. 10, FIG. 13 illustrates a cross-sectional view taken along line I-I' in the camera module 100A shown in FIG. 10, FIG. 14 illustrates an exploded perspective view of a portion of the camera module 100A shown in FIG. 10, and FIG. 15 illustrates an exploded perspective view of a portion of the camera module 100A shown in FIG. 10.

The camera module 100A illustrated in FIGS. 10 to 15 may compensate for shaking of the camera module 100A by performing the first operation and the third operation in a combined manner or by performing the fifth operation.

The camera module 100A may include a lens assembly, an actuator 430A, a plurality of first bearings 572, a sensor substrate 560, a main board 570, and an image sensor 130A. In addition, the camera module 100A may further include a cover 510 and a middle base 530. In addition, the camera module 100A may further include a filter base 540 and a filter 550.

According to an embodiment, at least one of the components 510 to 550 of the camera module 100A shown in FIGS. 10 to 15 may be omitted. Alternatively, at least one component other than the components 200A, 430A and 510 to 572 may be further included in the camera module 100A.

The lens assembly may include at least one of a liquid lens module 200A, a holder 520, or a plurality of lenses LL1, LL2, LL3, LL4 and LL5. Here, the lens assembly may perform the same function as the lens assembly 110 shown in FIG. 1, the liquid lens 260 may perform the same function as the liquid lens 120 shown in FIG. 1, and the lenses LL1, LL2, LL3, LL4 and LL5 may perform the same functions as the lenses L1, L2, L3 and L4 shown in FIG. 1.

In the configuration shown in FIG. 1, the liquid lens 120 is disposed outside the lens assembly 110. However, as shown in FIGS. 10 to 13, the liquid lens 260 may be contained in the lens assembly. Unlike the liquid lens 260 of the liquid lens module 200A, each of the lenses LL1 to LL5 may be a solid lens formed of glass or plastic, but the embodiment is not limited as to the specific material of each of the lenses LL1 to LL5.

Some LL1 and LL2 of the lenses LL1 to LL5 may be disposed at the upper side of the lens assembly above the liquid lens 260 inside the holder 520, and the others LL3 to LL5 of the lenses LL1 to LL5 may be disposed at the lower side of the lens assembly below the liquid lens 260 inside the holder 520. The lenses LL1 to LL5 may be implemented using a plurality of lenses that are aligned along a center axis to form an optical system, or may be implemented using a single lens. Here, the center axis may be an optical axis LX of the optical system, which is formed by the lenses LL1 to LL5 and the liquid lens 260 included in the camera module 100A, or may be an axis parallel to the optical axis LX. The optical axis LX may correspond to the optical axis of the image sensor 130A. That is, the lenses LL1 to LL5, the liquid lens 260, and the image sensor 130A may be aligned along the optical axis LX through active alignment (AA). Here, active alignment may mean an operation of aligning the optical axes of the lenses LL1 to LL5 and the liquid lens 260 with each other and adjusting an axial relationship or distance relationship between the image sensor 130A and the lenses LL1 to LL5 (200A) in order to acquire an improved image.

In addition, as illustrated in FIG. 13, the lenses may include, for example, five lenses LL1 to LL5, but this is merely given by way of example, and four or fewer lenses or six or more lenses may be included. Further, the lens LL1 located at the uppermost position, among the lenses LL1 to LL5, functions as an exposure lens that protrudes upwards from the holder 520, and faces the risk of damage to the surface thereof. When the surface of the exposure lens LL1 is damaged, the quality of an image captured by the camera module 100A may be deteriorated. Therefore, in order to prevent or minimize damage to the surface of the exposure lens LL1, a cover glass may be disposed, or a coating layer may be formed on the top of the exposure lens LL1.

Alternatively, in order to prevent damage to the surface of the exposure lens LL1, the exposure lens LL1 may be formed of a wear-resistant material having higher rigidity than the other lenses LL2 to LL5. The outer diameter of each of the lenses LL1 to LL5 may gradually increase in a direction approaching the bottom (e.g. the −z-axis direction), but the embodiment is not limited thereto.

The light incident on the lenses LL1 and LL2 from the outside of the camera module 100A may pass through the liquid lens module 200A, and may be incident on the lenses LL3 to LL5.

The liquid lens module 200A is an embodiment of the liquid lens module 200 shown in FIG. 2, and may include a first connection substrate 241, a second connection substrate 244, a spacer 250, and a liquid lens 260. Here, the first connection substrate 241, the second connection substrate 244, and the liquid lens 260 correspond to the first connection substrate 241, the second connection substrate 244, and the liquid lens shown in FIG. 2, respectively.

The first connection substrate 241 may electrically connect a plurality of first electrodes (E1 shown in FIG. 2) included in the liquid lens 260 to the main board 570, and may be disposed above the liquid lens 260. The first connection substrate 241 may be implemented as a flexible printed circuit board (FPCB). In addition, the first connection substrate 241 may be electrically connected to an electrode pad (not shown), which is formed on the main board 570, via a connection pad (not shown), which is electrically connected to each of the first electrodes E1. To this end, after the liquid lens module 200A is inserted into the inner space of the holder 520, the first connection substrate 241 may be subjected to bending in the −z-axis direction toward the main board 570, and thereafter the connection pad (not shown) and the electrode pad (not shown) may be electrically connected to each other via conductive epoxy.

The second connection substrate 244 may electrically connect a second electrode (E2 shown in FIG. 2) included in the liquid lens 260 to the main board 570, and may be disposed below the liquid lens 260. The second connection substrate 244 may be implemented as an FPCB or a single metal substrate (a conductive metal plate). The second connection substrate 244 may be electrically connected to an electrode pad, which is formed on the main board 570, via a connection pad, which is electrically connected to the second electrode E2. To this end, after the liquid lens module 200A is inserted into the inner space of the holder 520, the second connection substrate 244 may be subjected to bending in the −z-axis direction toward the main board 570. A driving voltage may be supplied to the liquid lens 260 via the first connection substrate 241 and the second connection substrate 244.

An upper hole and a lower hole, which are through-holes, may be formed respectively in the upper portion and the lower portion of the holder 520. Some LL1 and LL2 of the lenses LL1 to LL5 may be accommodated in, mounted in, seated in, in contact with, fixed to, provisionally fixed to, supported by, coupled to, or disposed in the upper hole in the holder 520, and the others LL3 to LL5 among the lenses LL1 to LL5 may be accommodated in, mounted in, seated in, in contact with, fixed to, provisionally fixed to, supported by, coupled to, or disposed in the lower hole in the holder 520.

In addition, the first and second sidewalls of the holder 520 may be disposed so as to face each other in a first direction perpendicular to the direction of the optical axis LX (e.g. in the x-axis direction). The first sidewall may include a first opening OP1, and the second sidewall may include a second opening OP2 having a shape that is the same as or similar to that of the first opening OP1. Thus, the first opening OP1 disposed in the first sidewall and the second opening OP2 disposed in the second sidewall may be disposed so as to face each other in the first direction perpendicular to the direction of the optical axis LX (e.g. in the x-axis direction).

The inner space in the holder 520, in which the liquid lens module 200A is disposed, may be open due to the first and second openings OP1 and OP2. In this case, the liquid lens module 200A may be inserted through the first or second opening OP1 or OP2 so as to be mounted in, seated in, in contact with, fixed to, provisionally fixed to, supported by, coupled to, or disposed in the inner space in the holder 520. For example, the liquid lens module 200A may be inserted into the inner space in the holder 520 through the first opening OP1.

The spacer 250 may be disposed so as to surround the side surface of the liquid lens 260, and may protect the liquid lens 260 from external impacts. To this end, the spacer 250 may have a shape, for example, a ring shape, that allows the liquid lens 260 to be mounted in, seated in, in contact with, fixed to, provisionally fixed to, supported by, coupled to, or disposed in the spacer. For example, the spacer 250 may include a hollow region in which the liquid lens 260 is accommodated, and a frame configured to surround the hollow region formed in the center thereof. As such, the spacer 250 may have a centrally-hollowed square planar shape (hereinafter referred to as a '□'-shaped form), but the embodiment is not limited thereto. The first and second connection substrates 241 and 244 may have a shape corresponding to the shape of the spacer 250, and may include a ring shape.

In addition, the spacer 250 may be disposed between the first connection substrate 241 and the second connection substrate 244, and may be disposed so as to protrude from at least one of the first or second opening OP1 or OP2 in the holder 520. That is, at least a portion of the spacer 250 may be shaped so as to protrude, along with the first and second connection substrates 241 and 244, from at least one of the first or second sidewall of the holder 520 in the first direction perpendicular to the optical axis LX (e.g. in the x-axis direction). The reason for this is that the length of the spacer 250 in the x-axis direction is greater than the length of the holder 520 in the x-axis direction. Furthermore, at least a portion of the spacer 250 may be disposed in at least one of the first opening OP1 or the second opening OP2.

In addition, although not shown, the camera module 100A may further include first and second adhesive members (not shown) for coupling the holder 520 and the liquid lens module 200A in the first and second openings OP1 and OP2.

The cover 510 may be disposed so as to surround the holder 520, the liquid lens module 200A, and the middle base 530, and may protect these components 200A, 520 and 530 from external impacts. In particular, since the cover 510 is disposed, the lenses LL1 to LL5 and the liquid lens module 200A, which form an optical system, may be protected from external impacts. In addition, in order to allow the lenses LL1 and LL2 disposed in the holder 520 to be exposed to external light, the cover 510 may include an upper opening 510H formed in the upper surface of the cover 510.

Meanwhile, the middle base 530 may be disposed so as to surround the lower hole in the holder 520. To this end, the middle base 530 may include an accommodation hole 530H1 for accommodating the lower hole therein. Similar to the upper opening 510H in the cover 510, the accommodation hole 530H1 may be formed near the center of the middle base 530 at a position corresponding to the position of the image sensor 130A, which is disposed in the camera module 100A.

The filter 550 may filter light within a specific wavelength range, among the light that has passed through the lenses LL1 to LL5 and the liquid lens 260. The filter 550 may be an infrared (IR) light blocking filter or an ultraviolet (UV) light blocking filter, but the embodiment is not limited thereto. The filter 550 may be disposed inside the filter base 540 above the image sensor 130A. For example, the filter 550 may be disposed or mounted in an inner recess in the filter base 540 or on a stepped portion thereof. The filter base 540 may be disposed below the middle base 530, and may be attached to the sensor substrate 560. Alternatively, the camera module 100A may not include either of the filter base 540 or the filter 550.

The sensor substrate 560 may be disposed below the filter base 540, and may include a first accommodation recess 560H1 in which the image sensor 130A is mounted, seated, tightly disposed, fixed, provisionally fixed, supported, coupled, or accommodated. As such, since the image sensor 130A is disposed in the first accommodation recess 560H1, when the sensor substrate 560 moves in the horizontal direction or rotates about the optical axis LX, the image sensor 130A may also move or rotate together therewith.

The main board 570 may be disposed below the sensor substrate 560, and may include a circuit element or a connector, although not shown. The circuit element of the main board 570 may constitute the controller 160, which controls the liquid lens module 200A and the image sensor 130A. The sensor substrate 560 or the main board 570 may be implemented as a rigid flexible printed circuit board (RFPCB) including an FPCB. The FPCB may be subjected to bending depending on the requirements of the space in which the camera module 100A is mounted.

The sensor substrate 560, the main board 570, the image sensor 130A, the first bearings 572, and the actuator 430A shown in FIGS. 10 to 15 may correspond to and perform the same functions as the respective embodiments of the moving substrate 410, the fixed substrate 420, the image sensor 130, the connection part 440, and the actuator 430 shown in FIG. 8.

The main board 570 may include a second accommodation recess 570H accommodating the first bearings 572. In addition, although not shown, the sensing unit 140 may be disposed on the main board 570, which serves as the fixed substrate 420. In this case, the sensor substrate 560 may include a third accommodation recess 560H2 accommodating the first bearings 572 together with the second accommodation recess 570H. The first bearings 572, which serve as the connection part 440 shown in FIG. 8, may be in point contact with a lower surface 560B of the sensor substrate 560 in the third accommodation recess 560H2 in the sensor substrate 560, and may be in point contact with an upper surface 570T of the main board 570 in the second accommodation recess 570H in the main board 570 in order to electrically connect the sensor substrate 560 and the main board 570.

When the sensor substrate 560 moves in the horizontal direction or rotates on the main board 570, the first bearings 572 and the lower surface 560B of the sensor board 560 may be separated from each other, or the first bearings 572 and the upper surface 570T of the main board 570 may be separated from each other. In this way, when the first bearings 572 are separated from the sensor substrate 560 or the main board 570, it may be difficult to maintain the electrical connection between the sensor substrate 560 and the main board 570 via the first bearings 572. In order to prevent this, the connection part 440 shown in FIG. 8 may further include first and second viscous bodies 564 and 566, in addition to the first bearings 572, as shown in FIG. 13.

The first viscous body 564 may be disposed around the point contact portions between the first bearings 572 and the lower surface 560B of the sensor substrate 560, and the second viscous body 566 may be disposed around the point contact portions between the first bearings 572 and the upper surface 570T of the main board 570. Each of the first and second viscous bodies 564 and 566 may be made of a material that is electrically conductive and viscous enough not to interfere with the rotation of the first bearings 572. For example, each of the first and second viscous bodies 564 and 566 may be a conductive fluid (e.g. conductive grease).

The actuator 430A may include a plurality of first magnets 432 (432-1 to 432-4) and a plurality of coils 434 (434-1 to 434-4).

The first magnets 432 (432-1 to 432-4) may be secured to one of the sensor substrate 560 and the main board 570, and may be spaced apart from each other. The coils 434 (434-1 to 434-4) may be secured to the other one of the sensor substrate 560 and the main board 570, and may be disposed so as to face the first magnets 432 (432-1 to 432-4). The embodiment is not limited as to the specific positions of the first magnets 432 (432-1 to 432-4) and the coils 434 (434-1 to 434-4), so long as the sensor substrate 560 is moved in the horizontal direction or is rotated about the optical axis LX by electromagnetic interaction between the first magnets 432 (432-1 to 432-4) and the coils 434 (434-1 to 434-4) when current is supplied to the coils 434 (434-1 to 434-4) in the state in which the first magnets 432 (432-1 to 432-4) and the coils 434 (434-1 to 434-4) face each other. For example, as illustrated, the first magnets 432 (432-1 to 432-4) may be fixedly disposed on the respective four corners of the upper surface of the sensor substrate 560, and the coils 434 (434-1 to 434-4) may be disposed on the four corners of the upper surface of the main board 570 so as to face the first magnets 432 (432-1 to 432-4). Alternatively, unlike the illustrated configuration, the first magnets 432 (432-1 to 432-4) may be fixedly disposed on the respective four corners of the upper surface of the main board 570, and the coils 434 (434-1 to 434-4) may be disposed on the four corners of the upper surface of the sensor substrate 560 so as to face the first magnets 432 (432-1 to 432-4).

The controller 160 may perform control such that the first driving unit 152A adjusts the intensity and direction of the current supplied to the coils 434 (434-1 to 434-4) and selectively supplies current only to a corresponding coil among the coils 434 (434-1 to 434-4), thereby changing the intensity or direction of the force applied to the sensor substrate 560 and moving the same due to the electromagnetic interaction between the coils 434 (434-1 to 434-4) and the first magnets 432 (432-1 to 432-4). Accordingly, the sensor substrate 560 is capable of moving in any one of the x-axis direction and the y-axis direction or of rotating about the z-axis.

In addition, in order to prevent the sensor substrate 560 from being separated when the sensor substrate 560 moves or rotates, the first driving unit 152A shown in FIG. 8 may further include at least one second bearing 562 (562-1 to 562-4), shown in FIGS. 10 to 15. To this end, in the state in which the middle base 530 is disposed between the lens assembly 200A, 520, and LL1 to LL4 (or 260, 520, and LL1 to LL4) and the sensor substrate 560, the second bearings 562 (562-1 to 562-4) may be disposed between the middle base 530 and the sensor substrate 560 so as to press the upper surface of the sensor substrate 560. To this end, the middle base 530, as shown in FIG. 15, may further include fourth accommodation recesses 530H2-1 to 530H2-4 for accommodating the second bearings 562 (562-1 to 562-4).

Hereinafter, camera modules 100B, 100C and 100D according to other embodiments including embodiments 154A, 154B and 154C of the second driving unit 154 in the camera module 100 shown in FIG. 1 will be described with reference to the accompanying drawings.

FIG. 16 illustrates a cross-sectional view of a camera module 100B according to another embodiment. Except for a second driving unit 154A, the camera module 100B shown in FIG. 16 is the same as the camera module 100 shown in FIG. 1, and thus the same components are denoted by the same reference numerals, and duplicate descriptions thereof will be omitted.

For convenience of description, components other than the lens assembly 110 and the second driving unit 154 of the camera module 100 shown in FIG. 1 are not illustrated in the camera module 100B shown in FIG. 16.

The camera module 100B shown in FIG. 16 may include a lens assembly 110 and a second driving unit 154A. As described above, the second driving unit 154A may perform the second operation of moving the lens assembly 110 in the direction of the arrow AR1.

The second driving unit 154A shown in FIG. 16 may include a fixed member 450, an elastic member 452, and first and second driving actuators 456 and 458. In addition, the second driving unit 154A may further include a stopper 454.

The fixed member 450 may accommodate the elastic member 452, the stopper 454, and the lens assembly 110, and may be fixed so as to be immobile, unlike the lens assembly 110.

The elastic member 452 may be disposed between the lens assembly 110 and the fixed member 450, and may be elastic so that the lens assembly 110 may move in the direction of the arrow AR1. For example, the elastic member 452 may be implemented as a spring.

One of the first and second driving actuators 456 and 458 may be secured to the lens assembly 110, and the other one of the first and second driving actuators 456 and 458 may be secured to the fixed member 450. Although it is illustrated in FIG. 16 that the first driving actuator 456 is disposed on the fixed member 450 and the second driving actuator 458 is disposed on the lens assembly 110, the embodiment is not limited thereto. According to another embodiment, unlike what is illustrated in FIG. 16, the second driving actuator 458 may be disposed on the fixed member 450, and the first driving actuator 456 may be disposed on the lens assembly 110.

Further, the first and second driving actuators 456 and 458 may be disposed so as to face each other in a second direction (e.g. the y-axis direction) in which the lens assembly 110 moves. The purpose of this is to move the lens assembly 110 through interaction between the first and second driving actuators 456 and 458.

Further, in order to prevent the lens assembly 110 from moving a distance longer than a desired distance when the lens assembly 110 moves in the second direction due to the operation of the first and second driving actuators 456 and 458, the stopper 454 may be disposed in the path along which the lens assembly 110 moves. For example, the stopper 454 may be disposed between the lens assembly 110 and the fixed member 450.

Describing the operation of the second driving unit 154A having the above-described configuration, the first and second driving actuators 456 and 458, which are driven under the control of the controller 160, may interact with each other so as to move the lens assembly 110 in the second direction (e.g. the y-axis direction). For example, it is possible to move the lens assembly 110 in the −y-axis direction or the +y-axis direction due to interaction between the first and second driving actuators 456 and 458 by changing the signal level of the driving voltage (or driving current) supplied from the controller 160 to each of the first and second driving actuators 456 and 458.

FIG. 17 illustrates a cross-sectional view of a camera module 100C according to still another embodiment. Except for a second driving unit 154B, the camera module 100C shown in FIG. 17 is the same as the camera module 100 shown in FIG. 1, and thus the same components are denoted by the same reference numerals, and duplicate descriptions thereof will be omitted.

For convenience of description, components other than the lens assembly 110, the second driving unit 154, and the image sensor 130 of the camera module 100 shown in FIG. 1 are not illustrated in the camera module 100C shown in FIG. 17.

The camera module 100C shown in FIG. 17 may include a lens assembly 110, an image sensor 130, a moving member 460, a magnet 462, an elastic member 464, a coil 466, and a fixed member 468. As described above, the second driving unit 154B may perform the second operation of moving the lens assembly 110 in the direction of the arrow AR1.

The lens assembly 110 may be mounted to the moving member 460 so as to move together with the moving member 460 when the moving member 460 moves in the direction of the arrow AR1. In order to enable this movement in the direction of the arrow AR1, the elastic member 464 may be disposed between the moving member 460 and the fixed member 468. The elastic member 464 may be implemented as a type of line spring.

The magnet 462 may be mounted on the lower surface of the moving member 460, but the embodiment is not limited as to the specific position at which the magnet 462 is mounted on the moving member 460, so long as the magnet 462 faces the coil 466 and electromagnetically interacts therewith.

The fixed member 468 is a member to which the image sensor 130 and the coil 466 are mounted, and which may supply an operation voltage for operating the image sensor 130 to the image sensor 130 or may receive image data, which is an electrical signal of an image captured by the image sensor 130, from the image sensor 130. In addition, the fixed member 468 may also serve to supply a driving current to the coil 466. In order to perform this function, the fixed member 468 may be implemented as a rigid flexible printed circuit board (RFPCB) including an FPCB, like the sensor substrate 560 or the main board 570.

The coil 466 may be disposed on the fixed member 468 so as to face the magnet 462. The embodiment is not limited as to the specific position at which the coil 466 is mounted to the fixed member 468, so long as the coil 466 faces the magnet 462 and electromagnetically interacts therewith.

Describing the operation of the second driving unit 154B having the above-described configuration, when a driving current is supplied to the coil 466 under the control of the controller 160, the moving member 460 may be moved together with the lens assembly 110 in the second direction (e.g. the y-axis direction) by electromagnetic interaction between the coil 466 and the magnet 462. For example, the moving direction of the lens assembly 110 mounted to the moving member 460 may be changed to the −y-axis direction or the +y-axis direction by changing the signal level of the driving current supplied from the controller 160 to the coil 466 to a positive (+) or negative (−) level. In addition, the amount of movement of the lens assembly 110 mounted to the moving member 460 may be adjusted by varying the magnitude of the level of the driving current supplied from the controller 160 to the coil 466.

FIG. 18 illustrates a cross-sectional view of a camera module 100D according to still another embodiment. Except for a second driving unit 154C, the camera module 100D shown in FIG. 18 is the same as the camera module 100 shown in FIG. 1, and thus the same components are denoted by the same reference numerals, and duplicate descriptions thereof will be omitted.

For convenience of description, components other than the lens assembly 110 and the second driving unit 154 of the camera module 100 shown in FIG. 1 are not illustrated in the camera module 100D shown in FIG. 18.

Further, it is illustrated in FIG. 1 that four lenses L1 to L4 are accommodated in the lens assembly 110, whereas it is illustrated in FIG. 18 that five lenses L1 to L5 are accommodated in the lens assembly 110. Furthermore, it has been described above that the second lens L2 is moved in order to perform the fourth operation, whereas the first lens L1 may be moved in order to perform the fourth operation, as shown in FIG. 18.

The camera module 100D shown in FIG. 18 may include a lens assembly 110 and a second driving unit 154C. As described above, the second driving unit 154C performs the fourth operation of moving one (e.g. L1) of the lenses included in the lens assembly 110 in the direction of the arrow AR2.

The second driving unit 154C shown in FIG. 18 may include an elastic member 472, first and second driving actuators 474 and 476, and a moving member 478.

The moving member 478 serves to accommodate a lens (e.g. L1) to be moved, among the lenses L1 to L5 accommodated in the lens assembly 110. In other words, the lens L1 to be moved may be moved along with the movement of the moving member 478.

The elastic member 472 is disposed between the lens assembly 110 and the moving member 478, and serves to provide elasticity when the moving member 478 moves in the direction of the arrow AR2. For example, the elastic member 472 may be implemented as a spring, and the moving member 478 may be supported on the body of the lens assembly 110 by the elastic member 472.

One of the first and second driving actuators 474 and 476 may be secured to the lens assembly 110, and the other one of the first and second driving actuators 474 and 476 may be secured to the moving member 478. Although it is illustrated in FIG. 18 that the first driving actuator 474 is secured to the lens assembly 110 and the second driving actuator 476 is secured to the moving member 478, the embodiment is not limited thereto. According to another embodiment, unlike what is illustrated in FIG. 18, the second driving actuator 476 may be secured to the lens assembly 110, and the first driving actuator 474 may be secured to the moving member 478. The first and second driving actuators 474 and 476 may be disposed so as to face each other in the second direction (e.g. the y-axis direction) in which the lens L1 moves. The purpose of this is to move the lens L1 together with the moving member 478 through interaction between the first and second driving actuators 456 and 458.

Describing the operation of the second driving unit 154C having the above-described configuration, the first and second driving actuators 474 and 476 interact with each other under the control of the controller 160 to move the lens L1 in the second direction (e.g. the y-axis direction). For example, it is possible to move the lens L1 a desired distance in the –y-axis direction or the +y-axis direction through the interaction between the first and second driving actuators 474 and 476 by changing the signal level of the driving voltage (or driving current) supplied from the controller 160 to each of the first and second driving actuators 474 and 476.

Although only a limited number of embodiments have been described above, various other embodiments are possible. The technical contents of the above-described embodiments may be combined into various forms as long as they are not incompatible with one another, and thus may be implemented in new embodiments.

Meanwhile, an optical device may be implemented using the camera module 100 (100A to 100D) according to the embodiments described above. Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical devices that may include a lens assembly.

In addition, the optical device may be implemented in a portable device such as, for example, a smartphone, a laptop computer, or a tablet computer. Such an optical device may include the camera module 100 (100A to 100D), a display unit (not shown) configured to output an image, a battery (not shown) configured to supply power to the camera module 100 (100A to 100D), and a body housing in which the camera module 100 (100A to 100D), the display unit, and the battery are mounted. The optical device may further include a communication module, which may communicate with other devices, and a memory unit, which may store data. The communication module and the memory unit may also be mounted in the body housing.

Hereinafter, when shaking (or hand tremor) occurs in an optical device including the camera 100 (100A to 100D) according to the embodiment, the operation example of the camera module 100 (100A to 100D) according to the embodiment for compensating for such shaking will be described.

FIG. 19 is a diagram for explaining shaking of an optical device 600 including the camera module 100 (100A to 100D) according to the embodiment.

The optical device 600 shown in FIG. 19 may be shaken by movement 602 in the x-axis direction, may be shaken by movement 604 in the y-axis direction, may be shaken by movement 606 in the z-axis direction, may be shaken by tilting 608 in the x-axis direction, may be shaken by tilting 610 in the y-axis direction, or may be shaken by tilting 612 in the z-axis direction.

In this case, the shaking attributable to the movement 606 in the z-axis direction may be compensated for by performing an AF function, and the other kinds of shaking 602, 604 and 608 to 612 may be compensated for by performing an OIS function.

If the focal length FL is 3.7 mm and the size of the unit pixel of the image sensor 130 or 130A is 1 μm, the camera module 100 (100A to 100D) according to the embodiment may compensate for shaking, as described in Table 1 below, depending on the direction and degree of shaking.

TABLE 1

| | type of shaking | | | | | |
|---|---|---|---|---|---|---|
| | x-axis movement | y-axis movement | z-axis movement | x-axis tilting | y-axis tilting | z-axis tilting |
| compensation effect | –x-axis movement | –y-axis movement | defocus | –x-axis movement | –y-axis movement | rotation |
| distance (1 m) | 3 pixel | 3 pixel | 0 μm defocus | 60 pixel | 60 pixel | 40 pixel |
| distance (30 cm) | 15 pixel | 15 pixel | 2 μm defocus | 60 pixel | 60 pixel | 40 pixel |

Here, "defocus" indicates the state in which focusing is not performed.

Table 1 shows compensation performed when shaking of 1 mm occurs along each of the x-axis, the y-axis, and the z-axis and tilting of 1° occurs along each of the x-axis, the y-axis and the z-axis. Further, shaking caused by movement along the x-axis or the y-axis and shaking caused by tilting along the x-axis, the y-axis, or the z-axis are compensated for using one of the first and second operations and one of the third and fourth operations. Due to this compensation, an image captured by the image sensor 130 or 130A may be moved along the –x-axis in order to compensate for shaking caused by movement along the x-axis, may be moved along the –y-axis in order to compensate for shaking caused by movement along the y-axis, may be moved along the –x-axis in order to compensate for shaking caused by tilting along the x-axis, may be moved along the –y-axis in order to compensate for shaking caused by tilting along the y-axis, and may be rotated about the z-axis in order to compensate for shaking caused by tilting along the z-axis.

Further, when the distance between the object to be photographed and the camera module is 1 m, an image captured by the image sensor 130 or 130A may be moved 3 pixels in order to compensate for shaking caused by movement along each of the x-axis and the y-axis, may be moved 60 pixels in order to compensate for shaking caused by tilting along each of the x-axis and the y-axis, and may be rotated 40 pixels about the z-axis in order to compensate for shaking caused by tilting along the z-axis.

Furthermore, when the distance between the object to be photographed and the camera module is 30 cm, an image captured by the image sensor 130 or 130A may be moved 15 pixels in order to compensate for shaking caused by movement along each of the x-axis and the y-axis, may be moved 60 pixels in order to compensate for shaking caused by tilting along each of the x-axis and the y-axis, and may be rotated 40 pixels about the z-axis in order to compensate for shaking caused by tilting along the z-axis.

As illustrated in Table 1, it can be seen that the camera module 100 (100A to 100D) according to the embodiment is capable of compensating for shaking in the directions of the five axes (x-axis movement, y-axis movement, x-axis tilting, y-axis tilting, and z-axis tilting).

If only the lens assembly 110 is moved or if only the image sensor 130 is moved in order to compensate for shaking of the camera module, as described above, the shaking may not be properly compensated for, and thus the image obtained by the image sensor 130 may be distorted. However, the camera module 100 (100A to 100D) according to the embodiment is capable of performing an operation of moving the lens assembly 110, an operation of moving one of the lenses included in the lens assembly 110, and an operation of moving the image sensor 130 or 130A in a combined manner. In particular, it is possible to perform operations of correcting the peripheral portions P2 and P3 of the image sensor 130 or 130A to a greater extent and to a lesser extent than the center P1 thereof in a combined manner, thereby reducing distortion.

Furthermore, when shaking occurs due to rotation about the optical axis LX, the image sensor 130 or 130A may be rotated about the optical axis LX so as to compensate for the shaking.

Furthermore, in the camera module 100 or 100A according to the embodiment, since the image sensor 130A is accommodated in the accommodation recess 560H1 in the sensor substrate 560, the overall thickness of the camera module 100 or 100A may be reduced. Furthermore, since the first and second viscous bodies 564 and 566 are used, although the sensor substrate 560 and the main board 570 are spaced apart from each other by the first bearings 572, it is possible to secure the stability of the electrical connection between the sensor substrate 560 and the main board 570 via the first bearings 572.

It will be apparent to those skilled in the art that various changes in form and details may be made without departing from the spirit and essential characteristics of the disclosure set forth herein. Accordingly, the above detailed description is not intended to be construed to limit the disclosure in all aspects and to be considered by way of example. The scope of the disclosure should be determined by reasonable interpretation of the appended claims and all equivalent modifications made without departing from the disclosure should be included in the following claims.

MODE FOR INVENTION

Various embodiments have been described in the best mode for carrying out the disclosure.

INDUSTRIAL APPLICABILITY

A camera module according to embodiments may be used in portable devices such as, for example, camera/video devices, telescopic devices, microscopic devices, an interferometer, a photometer, a polarimeter, a spectrometer, a reflectometer, an auto-collimator, a lens-meter, a smartphone, a laptop computer, and a tablet computer.

The invention claimed is:

1. A camera module, comprising:
   a lens assembly comprising a plurality of solid lenses;
   an image sensor disposed on an optical axis of the plurality of solid lenses;
   a liquid lens disposed on the optical axis, the liquid lens being disposed on the image sensor, the liquid lens comprising a first liquid and a second liquid, the first liquid and the second liquid providing a single interface therebetween; and
   a controller configured to move the image sensor in a direction perpendicular to the optical axis,
   wherein, in response to movement of the image sensor by the controller, the controller is configured to change a position or a shape of the single interface or to change a position of at least one solid lens among the plurality of solid lenses.

2. The camera module according to claim 1, wherein the first liquid is a conductive liquid and the second liquid is a non-conductive liquid, and
   wherein, when the image sensor moves in a first direction, the at least one solid lens among the plurality of solid lenses moves in a second direction.

3. The camera module according to claim 1,
   wherein the second liquid is disposed closer to the image sensor than the first liquid, and
   wherein a direction in which the single interface is tilted varies depending on a direction in which the image sensor moves in a direction perpendicular to the optical axis.

4. The camera module according to claim 3, wherein a refractive index of the second liquid is greater than a refractive index of the first liquid,
   wherein the image sensor moves from a first position to a second position in a direction perpendicular to the optical axis, and
   wherein, in a direction parallel to the optical axis, a shortest distance between the single interface and the second position of the image sensor is shorter than a shortest distance between the single interface and the first position of the image sensor.

5. The camera module according to claim 3, wherein a refractive index of the first liquid is greater than a refractive index of the second liquid,
   wherein the image sensor moves from a first position to a second position in a direction perpendicular to the optical axis, and
   wherein, in a direction parallel to the optical axis, a shortest distance between the single interface and the first position of the image sensor is shorter than a shortest distance between the single interface and the second position of the image sensor.

6. The camera module according to claim 2, wherein the solid lens, controlled in position by the controller, comprises a convex lens, and the image sensor and the convex lens are controlled so as to move in different directions from each other.

7. The camera module according to claim 1, comprising:
   a moving body configured to move the image sensor, wherein the image sensor receives power via the moving body.

8. The camera module according to claim 1, comprising:
a driving unit and a moving body configured to move the image sensor,
wherein power is applied to the driving unit so as to move the image sensor via the moving body.

9. The camera module according to claim 7, comprising:
a moving substrate on which the image sensor is disposed; and
a fixed substrate disposed below the moving substrate,
wherein the moving body is disposed between the fixed substrate and the moving substrate.

10. The camera module according to claim 7, comprising:
a moving substrate on which the image sensor is disposed; and
a fixed substrate disposed below the moving substrate,
wherein the moving body connects the fixed substrate and the moving substrate.

11. The camera module according to claim 1, comprising a sensing unit configured to detect horizontal movement or rotational movement of the camera module,
wherein the controller is configured to move the image sensor using information received from the sensing unit.

12. A camera module, comprising:
a lens assembly comprising a plurality of solid lenses;
an image sensor disposed on an optical axis of the plurality of solid lenses;
a liquid lens disposed on the optical axis, the liquid lens being disposed on the image sensor;
a controller configured to move the image sensor in a direction perpendicular to the optical axis;
a moving substrate on which the image sensor is disposed;
a fixed substrate disposed below the moving substrate; and
a ball disposed between the moving substrate and the fixed substrate.

13. The camera module according to claim 12, wherein the fixed substrate comprises a first accommodation recess in which the ball is disposed, and
wherein the moving substrate comprises a second accommodation recess in which the ball is disposed.

14. The camera module according to claim 13, comprising a viscous body, which is disposed in the first accommodation recess or the second accommodation recess and is in contact with the ball.

15. The camera module according to claim 14, wherein the viscous body is a conductive fluid.

16. The camera module according to claim 12, comprising:
a detection sensor disposed on one of the moving substrate and the fixed substrate, to detect an amount of movement or an amount of rotation of the image sensor; and
a sensing magnet secured to the other of the moving substrate and the fixed substrate and disposed at a position corresponding to the Hall sensor.

17. The camera module according to claim 12, wherein the ball is configured to electrically connect the moving substrate and the fixed substrate.

18. A camera module, comprising:
a lens assembly including a plurality of solid lenses;
an image sensor disposed on an optical axis of the plurality of solid lenses;
a liquid lens disposed above the image sensor on the optical axis; and
a controller configured to move the lens assembly in a direction perpendicular to the optical axis,
wherein the liquid lens includes a conductive liquid and a non-conductive liquid that form a single interface therebetween, and
wherein, in response to movement of the lens assembly by the controller, the controller is further configured to change a position or a shape of the single interface or change a position of at least one solid lens among the plurality of solid lenses.

19. The camera module according to claim 18, wherein, when the lens assembly moves in a first direction, one solid lens among the plurality of solid lenses is configured to move in a second direction, and tilt the single interface of the liquid lens.

* * * * *